(12) United States Patent
Mohanty et al.

(10) Patent No.: US 12,458,538 B2
(45) Date of Patent: Nov. 4, 2025

(54) FUNCTIONAL WOUND HEALING DRESSINGS

(71) Applicant: Ambient Biosciences, Inc., Ann Arbor, MI (US)

(72) Inventors: Pravansu Mohanty, Canton, MI (US); Zhuoran Wang, Novi, MI (US); Subhendu Das, Farmington Hills, MI (US)

(73) Assignee: Ambient Biosciences, Inc., Ann Arbor, MI (US)

( * ) Notice: Subject to any disclaimer, the term of this patent is extended or adjusted under 35 U.S.C. 154(b) by 374 days.

(21) Appl. No.: 17/283,740

(22) PCT Filed: Oct. 24, 2019

(86) PCT No.: PCT/US2019/057810
§ 371 (c)(1),
(2) Date: Apr. 8, 2021

(87) PCT Pub. No.: WO2020/086812
PCT Pub. Date: Apr. 30, 2020

(65) Prior Publication Data
US 2021/0322229 A1    Oct. 21, 2021

Related U.S. Application Data

(60) Provisional application No. 62/749,974, filed on Oct. 24, 2018.

(51) Int. Cl.
*A61F 13/02*    (2024.01)
*A61F 13/00*    (2024.01)
(Continued)

(52) U.S. Cl.
CPC ...... *A61F 13/023* (2013.01); *A61F 13/00063* (2013.01); *A61F 13/069* (2013.01);
(Continued)

(58) Field of Classification Search
CPC .... A61F 13/02; A61F 13/023; A61F 13/0236; A61F 13/024; A61F 13/0276;
(Continued)

(56) References Cited

U.S. PATENT DOCUMENTS 6,311,522 B1 * 11/2001 Berry ...................... C03B 25/06
                                                               65/141
7,700,819 B2    4/2010 Ambrosio et al.
(Continued)

FOREIGN PATENT DOCUMENTS

CN        101588836 A       11/2009
CN        103990175 A  *     8/2014    .............. A61L 15/44
(Continued)

OTHER PUBLICATIONS

Translation of CN-103990175-A (Year: 2014).*
(Continued)

*Primary Examiner* — Rachael E Bredefeld
*Assistant Examiner* — Seth R. Brown
(74) *Attorney, Agent, or Firm* — Weston R. Gould; Dinsmore & Shohl LLP

(57) ABSTRACT

One aspect of the present disclosure relates to the use of vitrified active agents such as growth factors and/or one or more antimicrobial peptides (AMPs), or other desired active agent, for wound healing as a component of a wound dressing whereby the active agents are vitrified onto one or more polymeric materials, and their release rate regulated by the presence of one or more biodegradable polymeric materials.

27 Claims, 19 Drawing Sheets

(51) Int. Cl.
*A61F 13/06* (2006.01)
*A61L 15/26* (2006.01)
*A61L 15/28* (2006.01)
*A61L 15/32* (2006.01)
*A61L 15/44* (2006.01)

(52) U.S. Cl.
CPC ............... *A61L 15/26* (2013.01); *A61L 15/28* (2013.01); *A61L 15/325* (2013.01); *A61L 15/44* (2013.01); *A61L 2300/256* (2013.01); *A61L 2300/414* (2013.01); *A61L 2300/602* (2013.01)

(58) Field of Classification Search
CPC ............... A61F 13/00; A61F 13/00004; A61F 13/00008; A61F 13/00021; A61F 13/00029; A61F 13/00063; A61F 13/069; A61K 38/164; A61K 38/1866; A61K 38/28; A61L 15/16; A61L 15/26; A61L 15/28; A61L 15/32; A61L 15/325; A61L 15/44; A61L 15/64; A61L 2300/252; A61L 2300/256; A61L 2300/414; A61L 2300/602
USPC ...................................... 602/48, 49
See application file for complete search history.

(56) References Cited

U.S. PATENT DOCUMENTS

| | | | |
|---|---|---|---|
| 8,163,974 B2 * | 4/2012 | Ambrosio | A61F 13/00068 604/289 |
| 10,433,540 B2 | 10/2019 | Mohanty et al. | |
| 2004/0133141 A1 * | 7/2004 | Kiel | A61L 15/46 602/41 |
| 2004/0241212 A1 * | 12/2004 | Pendharkar | A61L 15/28 424/445 |
| 2006/0188486 A1 * | 8/2006 | Carpenter | A61K 38/39 424/445 |
| 2008/0206293 A1 | 8/2008 | Toreki et al. | |
| 2009/0258045 A1 * | 10/2009 | Chuang | A61L 27/54 424/409 |
| 2010/0150989 A1 * | 6/2010 | Hoffman | A61L 31/16 424/447 |
| 2011/0313383 A1 * | 12/2011 | Hofstetter | A61F 13/00 604/372 |
| 2014/0066865 A1 * | 3/2014 | Takita | A61P 17/00 604/307 |
| 2015/0086605 A1 | 3/2015 | Mauney et al. | |
| 2018/0117210 A1 * | 5/2018 | MacPhee | A61F 13/0246 |

FOREIGN PATENT DOCUMENTS

| | | | |
|---|---|---|---|
| CN | 108355171 A * | 8/2018 | ......... A61L 27/3633 |
| WO | 2013/144727 A2 | 10/2013 | |
| WO | WO2014/190038 A2 | 11/2014 | |
| WO | WO2016/057554 A1 | 4/2016 | |
| WO | WO2016/175358 A1 | 11/2016 | |
| WO | WO2017/011050 A2 | 1/2017 | |
| WO | WO2018/162900 A1 | 9/2018 | |

OTHER PUBLICATIONS

Translation of CN-108355171-A (Year: 2018).*
I.I. Katkov et al., Kinetic Vitrification of Spermatozoa of Vertebrates: What Can We Learn from Nature?, 2012, Current Frontiers in Cryobiology. (Year: 2012).*
Jacobi, J. et al., Discordant effects of a soluble VEGF receptor on wound healing and angiogenesis, Gene Therapy, 11: 302-309, 2004.
Imamura, K., Lyophilization of aqueous protein solution, Journal of Bioscience and Bioengineering, 96(3): 137-141, Mar. 2018.

* cited by examiner

FUNCTIONAL WOUND HEALING DRESSINGS

CROSS REFERENCE TO RELATED APPLICATIONS

This application depends from and claims priority to U.S. Provisional Application No. 62/749,974, filed Oct. 24, 2018, the entire contents of which are incorporated herein by reference.

FIELD

This disclosure is related to dressings or other sterile articles for use in covering a wound. The dressings as provided herein promote wound healing.

BACKGROUND

Several therapeutic approaches for inhibition of angiogenesis have been successfully used for treatment of different pathological conditions, including cancer. However, therapeutic strategies for stimulating angiogenesis and/or improving the non-functional blood vessels, such as treatment of impaired wound healing in diabetic ulcers, have been used only with limited success. Because vascular endothelial growth factor (VEGF) is known to play a key role in the regulation of angiogenesis, numerous approaches have been undertaken to use VEGF for treatment of different pathological conditions associated with impaired angiogenesis and vascular functions.

Unfortunately, several studies, including a recent clinical trial on the topical use of VEGF to improve diabetic foot ulcer healing failed in its phase II trials, and these results have been attributed to the short half-life of VEGF. Although the use of controlled-release gels and heterogeneous scaffold systems demonstrated extended exposure of wound tissues to topically applied VEGF, these strategies are not highly effective, mainly due to poor stability of VEGF at body temperature.

Furthermore, wound healing is a complex process involving the coordinated efforts of multiple cell types, and studies in recent years have suggested that VEGF could play a pleiotropic role in wound healing independent of its role in angiogenesis. VEGF receptors, long thought to be present only in endothelial cells, have now been identified in a variety of non-endothelial cell types, including keratinocytes and macrophages, both of which play essential roles in cutaneous wound healing. In vitro studies have documented direct effects of VEGF on keratinocyte proliferation and migration. However, these non-angiogenic functions of VEGF in wound healing are unclear with seemingly contradictory reports. For example, a recent study indicated that inhibition of VEGF signaling had no impact on wound closure despite complete blockade of wound angiogenesis.

As such, new mechanisms and devices are required for promoting wound healing by improving the delivery of one or more active agents to a desired site of action, such as a cutaneous wound, diabetic ulcer, or other treatment site.

SUMMARY

The following summary is provided to facilitate an understanding of some of the innovative features unique to the present disclosure and is not intended to be a full description. A full appreciation of the various aspects of the disclosure can be gained by taking the entire specification, claims, drawings, and abstract as a whole.

Provided are wound dressings that are capable of selectively releasing functional active agents to the site of a wound upon contact with a body fluid. The wound dressings include the active agent(s) vitrified to one or more layers of the wound dressing such that the active agents are time and temperature storage stable allowing active agents to be functional when delivered to the wound.

Wound dressings as provided herein include a time release active agent delivery layer, the time release active agent delivery layer including a water stable polymer and a biodegradable polymer, the water stable polymer further including one or more active agents vitrified to the water stable polymer, the time release active agent delivery layer configured such that the biodegradable polymer may allow release one or more active agents to a wound site over the course of a treatment time. By degradation of the biodegradable polymer upon contact with a body fluid, the active agent may then pass through or from the time release active agent delivery layer to the underlying wound, optionally by delayed delivery timed by the degradation time of one or more layers within the time release active agent delivery layer.

A wound dressing optionally includes one or more additional layers, optionally a scaffold layer that is optionally releasable from one or more other layers of the wound dressing so as to serve as a scaffold for cell migration and wound healing. The scaffold layer may include one or more active agents vitrified therein so as to be immediately deliverable to a wound upon contact with a body fluid.

A wound dressing may include other layers that allow release of one or more layers to the wound, or that may be suitable for time or delayed release of one or more active agents to the site of the wound.

Also provided are methods of promoting healing of a wound in a subject, optionally a human subject, whereby one or more of the wound dressings as provided herein are contacted to the wound for a treatment time. The processes may further include removing a first wound dressing and applying a second wound dressing for a second treatment time where the second wound dressing does or does not differ from the first wound dressing, optionally differing in the type or number of active agents, or the type or number of layers present. Optionally, a second wound dressing excludes a scaffold layer. Optionally, a second wound dressing includes one or more antimicrobial peptides, optionally covalently attached to one or more layers of the second wound dressing. Optionally, a second wound dressing excludes VEGF as an active agent.

BRIEF DESCRIPTION OF THE DRAWINGS

The aspects set forth in the drawings are illustrative and exemplary in nature and not intended to limit the subject matter defined by the claims. The following detailed description of the illustrative aspects can be understood when read in conjunction with the following drawings, where like structure is indicated with like reference numerals and in which:

DETAILED DESCRIPTION

Provided herein are wound dressings that are functional to promote improved wound healing or provide other therapeutic attributes to a wound of a subject. As described in detail herein, Applicant discovered that vitrification of one or more active agents (e.g. growth factors, illustratively vascular endothelial growth factor (VEGF)), offers an effective method of stabilizing the active agent at higher ambient temperatures than was previously achievable thereby promoting its therapeutic use at the site of an injury, disease or condition on or in the skin of a subject. The use of one or more active agents in wound dressings as provided herein allow the active agent to provide a positive physiological response such as in angiogenesis, reepithelialization and suppression of scar forming genes during wound repair.

Figure 1:
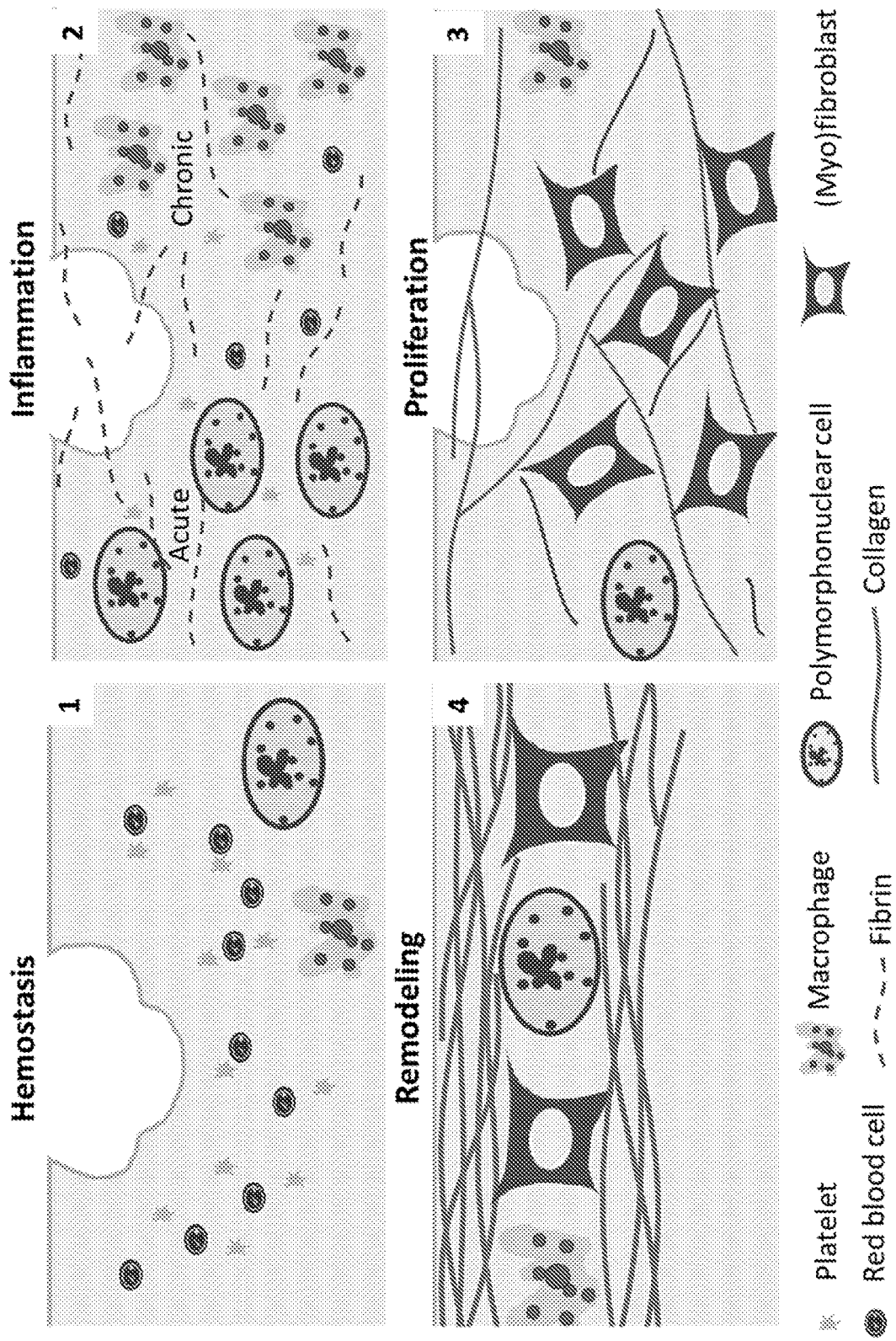
FIG. 1 illustrates a generalized wound healing process as it occurs in normal human skin.

The dressings as provided herein are able to deliver one or more growth factors, or other active agents to the site of a wound to promote wound healing, therapeutic treatment of a disease or condition, or otherwise resolve a defect in or on the skin of a subject. When a mammalian subject develops a skin lesion such as through abrasion, cutting, defect in the skin, or other means, the body produces a physiological response to help close the wound and heal the wounded area. As illustrated schematically in FIG. 1, development of a wound initiates a wound healing response that may begin with activation of the coagulation pathways promoted by exposure of tissue factor and activation of platelets at the site of the wound. The coagulation system cleaves circulating fibrinogen to form a fibrin network that leads to the cessation of bleeding. Wound healing continues by though a cooperation between epithelial cells, growth factors, chemokines, and inflammatory cells to leading to injury repair. Among the cells involved, polymorphonuclear cells (PMC), fibroblasts, macrophages and even epidermis resident T-cells all play a role in wound repair. For example epidermal resident T-cells were recently found to also express the epidermal growth factor (EFGR) receptor suggesting their role in also promoting wound healing and dermal and epidermal regeneration. Nosbaum, et al., *J Immunol*, 2016; 196:2010-2014. The EGFR-mediated signaling pathways play a major role in promoting wound healing activities at a wound site. Bodnar, et al., *Adv. Wound Care (New Rochelle)*, 2013; 2:24-29.

One aspect of the present disclosure relates to the use of vitrified vascular endothelial growth factor (VEGF) optionally along with one or more other specifically functional active agents, optionally antibodies, antimicrobial peptides (AMPs), insulin, or other functional active agent for wound healing and optionally scar prevention. It was found that by introducing a growth factor, such as VEGF, in a time-release manner, promoted improved wound healing. As such, wound dressings are provided herein that include a selectively dissolvable material or set or layers that entraps on one or more bioactive agents within a fibrous network preventing its release to the site of a wound. Upon dissolving of the biodegradable fibrous network following contact with a body fluid such as at the site of a wound, the one or more active agents may be selectively and directly delivered to the desired site of action so as to promote wound healing.

A "wound" as provided herein is any defect in the skin of a subject. A wound may be the result of an abrasion, avulsion, laceration, puncture, cancer, diabetic ulcer or lesion (e.g. bullosis diabeticorum), burn, surgery, or other injury or damage to the skin or layer of skin of a subject.

As used herein, a "subject" is an animal, optionally human, non-human primate, equine, bovine, murine, ovine, porcine, rabbit, or other mammal.

As such, provided herein according to some aspects are wound dressings that include a time release active agent delivery layer that includes one or more polymers whereby the polymer includes one or more active agents vitrifies within or on the polymer so as to be selectively released to the site of a wound upon dissolution of one or more biodegradable polymers by contact with a body fluid. The polymers may be in the form of a mesh, fibrous network (optionally non-woven), or other porous structure so as to allow fluid to penetrate the porous structure and lead to release of the active agent.

Optionally, a polymer is present in the form of a fibrous random or ordered mesh that defines channels or other continuous or discontinuous routes of access for a fluid or an active agent. Optionally, a polymer is in the form of a non-woven fibrous mesh with high porosity (e.g. greater than 50% by volume).

Polymers that may be used herein optionally can be formed into a porous mesh, such as in the form of a filter, symmetric mesh, or other such porous sheet-like material. Illustratively, a polymer is formed into a fibrous network such as by methods that include electrospinning. In electrospinning, desired polymers are placed in a desired solvent (e.g. 2,2,2-trifluoroethanol (TFE) or hexafluoroisopropanol (HFIP)) and subjected to electrospinning processes so as to form a fiber of desired cross sectional dimension and length and arranged in a desired orientation (optionally random) so as to have a resulting pore size (average distance between strands) to allow an active agent to pass through or be retained within or by the polymer network.

A time-release active agent delivery layer optionally includes two or more polymers that form the layer either by interweaving the polymers at the time of formation of the layer, by creating the layer by alternating electrospinning of individual polymers in an alternating fashion such that the time-release active agent delivery layer is formed of a plurality of thin individual layers, or by adhering different layers together to form an overall time release active agent delivery layer. Optionally, a time-release active agent delivery layer includes a biodegradable polymer and a water stable polymer whereby the biodegradable polymer and the water stable polymer are associated either by co-formation during the electrospinning process or by formation of one or more layers of water stable polymer alternating with one or more layers of biodegradable polymer so as to form an overall hybrid structure of two or more polymers with differing dissolution characteristics.

By including both a water stable polymer with a biodegradable polymer at differing relative amounts in the time release active agent delivery layer, the controlled release of the active agent can be effectively controlled. For example, inclusion of greater amounts, thicknesses, or propensity of a water stabilized polymer, the dissolution of the overall time release active agent delivery layer will be reduced leading to slower rates of active agent release. In contrast, by including higher amounts, thicknesses, or propensity of biodegradable polymer, the dissolution rate of the time release active agent delivery layer will increase and the rate of active agent release will be increased.

For example, a water stable polymer is optionally formed into a fibrous structure of a single layer or multilayer by electrospinning. A biodegradable layer may be placed on the water stable polymer and positioned toward a wound such that a body fluid must pass through the biodegradable layer to reach the water stable polymer layer. Any active agent released from the water stable polymer layer will be trapped within the system until the biodegradable polymer layer sufficiently dissolves so as to allow the active agent to be released into the wound. By creating a hybrid time release active agent delivery layer that is composed of differing amounts of biodegradable polymer or biodegradable polymer layers, the rate of active agent release is controlled by the dissolution of the biodegradable polymer.

As such, a time release active agent delivery layer is optionally a hybrid layer that includes a water stable polymer with one or more active agents vitrified therein, and one or more biodegradable polymer layers to control the rate of release of the active agent. Optionally, the time release active agent delivery layer includes one layer of water stable polymer. Optionally, the time release active agent delivery layer includes 2 or more layers of water stable polymer, optionally 3 or more, optionally 4 or more. Optionally, a time release active agent delivery layer includes one layer of biodegradable polymer, optionally 2 or more layers, optionally 3, 4, 5, 6, or more layers of biodegradable polymer.

Optionally, a water stable polymer is formed into a layer of fibrous mesh, optionally non-woven. Creation of the fibrous mesh may be achieved by creation of fibers with a fiber diameter of 0.1 micrometers ($\mu m$) to 200 $\mu m$. Optionally, the water stable polymer is in a fiber with a fiber diameter of greater than 0.5 $\mu m$, optionally from greater than 0.5 $\mu m$ to 4 $\mu m$, optionally greater than 0.5 $\mu m$ to 3 $\mu m$, optionally 0.5 $\mu m$ to 2 $\mu m$.

The resulting pore size of a water stable polymer layer is optionally from 10 $\mu m$ to 200 $\mu m$, optionally greater than 10 $\mu m$ to 40 $\mu m$, optionally 10 $\mu m$ to 35 $\mu m$, optionally greater than 10 $\mu m$ to 30 $\mu m$, optionally greater than 10 $\mu m$ to 30 $\mu m$, optionally greater than 10 $\mu m$ to 25 $\mu m$.

A water stable polymer layer has a thickness that is optionally 0.1 $\mu m$ or greater, optionally 0.5 $\mu m$, optionally 1 $\mu m$, optionally 2 $\mu m$, optionally 5 $\mu m$, optionally 10 $\mu m$, optionally 20 $\mu m$, optionally 50 $\mu m$, optionally 100 $\mu m$, optionally 200 $\mu m$, optionally 500 $\mu m$, or greater.

A water stable polymer is any polymeric material that will not dissolve in water in 30 minutes or less, optionally will not dissolve in 24 hours or greater, optionally 48 hours or greater. It is noted that a water stable polymer may not necessarily be entirely resistant to dissolution in water, but may be more resistant to dissolution than a biodegradable polymer as provided herein. Such a system allows the water stable polymer to degrade over a longer period of time (if at all) to allow longer duration deliver of one or more active agents to a wound site.

Illustrative examples of water stable polymers include, but are not limited to collagen, elastin, hyaluronic acid and derivatives, sodium alginate and derivatives, chitosan and derivatives, gelatin, starch, cellulose polymers (for example methylcellulose, hydroxypropylcellulose, hydroxypropylmethylcellulose, carboxymethylcellulose, cellulose acetate phthalate, cellulose acetate succinate, hydroxypropylmethylcellulose phthalate), poly(diol citrate) (e.g., poly(octanediol citrate), etc.), casein, dextran and derivatives, poly (caprolactone), poly(hydroxyl acids), poly(L-lactide) poly (D,L lactide), poly(D,L-lactide-co-glycolide), poly(L-lactide-co-glycolide), copolymers of lactic acid and glycolic acid, copolymers of ε-caprolactone and lactide, copolymers of glycolide and ε-caprolactone, copolymers of lactide and 1,4-dioxane-2-one, polymers and copolymers that include one or more of the residue units of the monomers D-lactide, L-lactide, D,L-lactide, glycolide, ε-caprolactone, trimethylene carbonate, 1,4-dioxane-2-one or 1,5-dioxepan-2-one, poly(glycolide), poly(hydroxybutyrate), poly(alkylcarbonate) and poly(orthoesters), polyesters, poly(hydroxyvaleric acid), polydioxanone, poly(ethylene terephthalate), poly (malic acid), poly(tartronic acid), polyanhydrides, polyphosphazenes, poly(amino acids), and copolymers of the above polymers as well as blends and combinations of the above polymers. Illustratively such polymers are as described in U.S. Patent Application Publication No: 2018/0125990 and references as cited therein including Illum, L., Davids, S. S. (eds.) "Polymers in Controlled Drug Delivery" Wright, Bristol, 1987; Arshady, J. Controlled Release 17:1-22, 1991; Pitt, Int. J. Phar. 59:173-196, 1990; Holland et al., J. Controlled Release 4:155-0180, 1986.

In some aspects, a water stable polymer is or includes polycaprolactone (PCL), collagen, or combinations thereof. The primary characteristics of such water stable polymers is that they are able to form networks or fibers such that one or more active agents may be vitrified thereon or therein. Thus, the water stable polymer must have sufficient stability in an aqueous environment so as to serve as a suitable surface for vitrification of an aqueous vitrification medium containing one or more active agents. Illustratively, a water stable polymer includes PCL of or about Mn 80,000 Da.

Optionally, a water stable polymer is or includes collagen. Collagen may be derived from a natural source, or chemically synthesized. Although any collagen type may be used, type-1 collagen is mentioned due to the ability to form a desirable fiber network and have suitable stability to serve as a stable polymer for delivery of one or more active agents. Collagen is optionally commercially sourced, such as from the skin of an animal (e.g. cow, pig, horse, human) or other source. Illustratively a collagen used for forming a fibrous layer of collagen is type-1 from calf skin with a molecular weight of 139 kDa (monomer).

In some aspects, a water stable polymer may be formed into a fibrous layer as provided herein or may be a naturally formed network such as that found by decellularizing the skin of a fish or animal. These acellular collagen networks have been investigated as skin substitutes for the treatment of burns or other large scale injuries. Optionally, a collagen is acellular fish skin such as that derived from cod or other desired fish optionally as described in Magnusson S, et al., *Laeknabladid*, 2015; 101(12):567-73 and Magnusson, et al., *Military Medicine,* 2017; 182, 3/4:383.

In contrast to the water stable polymer fiber layer, a biodegradable polymer is optionally of smaller fiber diameter and pore size, as well as is formed out of a polymeric material that will degrade upon contact with a body fluid to allow transfer of one or more active agents to the a desired site of action such as a wound. The size and material choice allows more rapid degradation of the biodegradable polymer material as well as retaining an active agent within a water stable polymer until such time as the biodegradable polymer sufficiently dissolves to allow the active agent to be released onto the wound.

As such, the term "biodegradable" as used herein with respect to a polymer means that the polymer is capable of being degraded, dissolved, or otherwise "broken down" under exposure to a body fluid. Illustratively, a body fluid is or includes water, blood, plasma, serum, serosanguineous fluid, and/or purulent exudate, or any combination thereof. In some embodiments, a biodegradable polymer is a broken down by dissolving in an aqueous environment, cellular machinery, enzymatic degradation, chemical processes, or other. In particular aspects, a biodegradable polymer will dissolve completely in an aqueous environment in 30 minutes or less when present alone. A biodegradable polymer as used herein is one that will dissolve in water at a rate in excess of 3 microns of polymer thickness per minute.

Specific illustrative examples of a biodegradable polymer include a polyether. Illustrative examples of a polyether include polyethylene glycol (referred to herein otherwise as ethylene oxide for high molecular weight polyethylene glycol polymers) and pullulan. Illustratively, a polyethylene glycol used to form a biodegradable polymer layer is of a viscosity average molecular weight of or about 600,000, although longer or shorter such polymeric materials may be similarly used. Optionally the viscosity average molecular weight is 400,000 to 700,000, optionally 500,000 to 700,000. Such, materials are able to successfully be formed into layers of biodegradable polymer by techniques such as electrospinning.

Optionally, a biodegradable polymer is formed into a fibrous mesh (optionally non-woven) with a fiber size of less than 0.5 µm, optionally 0.1 µm to 0.5 µm, optionally 0.1 µm to 0.4 µm, optionally 0.1 µm to 0.3 µm.

The biodegradable polymer fiber mesh has a pore size lower than that of the water stable polymer fiber layer. Optionally a biodegradable polymer layer has a pore size of less than 1 µm to 10 µm, optionally 1 µm to 10, optionally 2 µm to 10 µm, optionally 2 µm to 9 µm, optionally 3 µm to 8 µm, optionally 4 µm to 7 µm.

A biodegradable polymer layer has a thickness that is optionally 0.1 µm or greater, optionally 0.5 µm, optionally 1 µm, optionally 2 µm, optionally 5 µm, optionally 10 µm, optionally 20 µm, optionally 50 µm, optionally 100 µm, optionally 200 µm, optionally 500 µm, or greater.

A time release active agent delivery layer optionally further includes one or more layers of an immediate release vitrified active agent. It was found that an active agent could be directly vitrified during an electrospinning process to form a vitrified material layer that can be associated with or within the time release active agent delivery layer. By combining pullulan, trehalose, and an active agent in an electrospinning apparatus, the pullulan will serve as a fiber forming scaffold. In this way, the active agent does not crystallize during the electrospinning process, but is instead transferred into a vitrified glassy state so that the active agent can be included in a time release active agent delivery layer so as to be heat and storage time stable. As such, an immediate release vitrified active agent layer is optionally included with or within a time release active agent delivery layer. Optionally, 1, 2, 3, 4, 5, or more layers of immediate release vitrified active agent layers are included dispersed as desired in or in between one or more of the water stable polymer layers, the biodegradable polymer layers, or both.

The wound dressing as provided herein functions by creating a water stable polymer that includes one or more active agents included within the water stable polymer. The one or more active agents are optionally vitrified into the water stable polymer so as to form a layer of active agent that is stable to both time and temperature conditions, and can be reconstituted by contact with a body fluid to be released with activity similar to fresh (not stored) active agent. An active agent is optionally vitrified into a water stable polymer in the presence of trehalose substantially as described in U.S. Pat. No. 10,433,540. The pores of the water stable polymer allow rapid vitrification of the active agent into the pores to produce a stable active agent within the water stabilized polymer layer. Illustratively, a collagen or PCL membrane is used to vitrify a solution of active agent, trehalose, and glycerol in HEPES buffered saline. The vitrification solution is contacted to one or more layers of water stable polymer and the system encased in a vacuum chamber connected to a vacuum pump and desiccation system so as to continuously dry the active agent solution and form a stable glassy vitrified material within the water stable polymer layer(s). When employed in a wound dressing as provided herein, upon contact with a body fluid the vitrified active agent is reconstituted and able to migrate from the water stable polymer layer and into or onto the wound site so as to elicit one or more desired biologically relevant activities depending on the type of active agent released.

Alternatively, one or more active agents is covalently attached to a water stable polymer. For example, one or more anti-microbial peptides may be desired to function at the site of the wound, but be prevented from entering the wound area in free form so as to prevent release into the circulation. Alternatively, an antibody may be desired to be maintained within the dressing and not be released into the wound. Covalent bonding to a PCL water stable polymer, as an example, can be achieved by acrylating an active agent (e.g. antibody, AMP) by reacting the active agent with poly (ethylene glycol) diacrylate in phosphate buffered saline including ACRL-PEG-SVA 5000, and the photoinitiator 2-hydroxy-4'-(2-hydroxyethoxy)-2-methylpropiophenone. This can then be reacted with the PCL layers by coating on one or both sides then exposing the coated layer to UV light to covalently bond the active agent to the water stable polymer. This results in active agent covalently bonded to the water stable polymer. The resulting material can be subsequently used to vitrify one or more additional active agents into the water stable polymer or may be used in a multi-layer system with a separate layer that includes one or more active agents vitrified into the water stable polymer as described herein.

A time release active agent delivery layer, scaffold layer, or portion thereof, includes one or more active agents. An active agent is one that exhibits a desired bioactivity. Illustrative examples of active agents that have relevant bioactivity at the site of a wound include, but are not limited to: immunostimulating agents, antiviral agents, chemotherapeutic agents, PD-1 or PD-L1 inhibitors, insulin or a derivative thereof, growth factors, antikeratolytic agents, anti-inflammatory agents, antifungal agents, tretinoin, topical antihistamine agents, antibacterial agents (illustratively, but not limited to antimicrobial peptides), bioadhesive agents, procoagulants (e.g., activated factor VII, activated factor V, activated factor X, 3 or 4-factor prothrombin complex concentrate combination), inhibitors of prostaglandin synthesis (e.g., ibuprofen, aspirin, indomethacin, meclofenomic acid, retinoic acid, padimate O, meclomen, oxybenzone), steroidal anti-inflammatory agents (e.g., corticosteroids including synthetic analogs), antimicrobial agents (e.g., silvadine), antiseptic agents, anesthetic agents (e.g., pramoxine hydrochloride, lidocaine, benzocaine), burn relief medications, sun burn medications, acne preparations, fatty acids (e.g. omega-3-fatty acids), insect bite and sting medication, scar reducing agents (e.g., vitamin E), and the like, and mixtures thereof. Optionally, 2 or more active agents are included, optionally 3 or more, optionally 4 or more.

Optionally, a wound dressing or portion thereof includes one or more growth factors and one or more antimicrobial agents. Optionally, a wound dressing or portion thereof includes one or more growth factors, one or more antimicrobial agents, and one or more anti-inflammatory agents. Optionally, a wound dressing or portion thereof includes one or more growth factors, one or more antimicrobial agents, and one or more anti-inflammatory agents, and one or more fatty acids.

In some aspects, an active agent is or includes an antimicrobial agent, optionally an antimicrobial peptide (AMP). Any anti-microbial peptide may be used. Illustratively, an antimicrobial peptide is one or more of Maximin H5, Dermcidin, Cecropins, andropin, moricin, ceratotoxin, melittin, Magainin, dermaseptin, bombinin, brevinin-1, esculentins, buforin II, CAP18, LL37, any peptide described in Waghu, et al., *Front Microbiol.* 2018; 9: 325, or any combination of two or more thereof, among others. An AMP is optionally vitrified within a biodegradable polymer layer, a water stable polymer layer, or both. Optionally, 1, 2, 3, 4, 5, 6, or more AMPS are present in a water stable polymer layer as provided herein.

Optionally, an active agent is a growth factor. A "growth factor" as used herein is a polypeptide that stimulates cell growth or division in one or more cell types. Non-limiting examples of growth factors include vascular endothelial growth factor (VEGF), insulin-like growth factor (IGF), fibroblast growth factor (FGF), epidermal growth factor (EGF), hepatocyte growth factor (HGF), platelet derived growth factor (PDGF), and combinations of two or more thereof. A growth factor is optionally vitrified within a biodegradable polymer layer, a water stable polymer layer, or both. Optionally, 1, 2, 3, 4, 5, 6, or more growth factors are present in a water stable polymer layer as provided herein.

In some aspects, an active agent is or includes an anticancer agent. Illustrative anticancer agents include, but are not limited to an inhibitor of programmed cell death protein 1 (PD-1) or programmed cell death-ligand 1 (PD-L1) function, binding or synthesis. Optionally, an active agent is atezolizumab a humanized IgG molecule against PD-L1. Optionally, and active agent is pembrolizumab a humanized IgG molecule against PD-1. Optionally, an anticancer agent is imiquimod, fluorouracil, vismodegib, nivolumab, ipilimumab, avelumab, among others. Other active agents directed against one or more tumors may be included as well. An anticancer agent is optionally vitrified within a biodegradable polymer layer, a water stable polymer layer, or both. Optionally, 1, 2, 3, 4, 5, 6, or more anticancer agents are present in a water stable polymer layer as provided herein.

Optionally, an active agent is an antibody. The terms "antibody" and "antibodies" as used herein include monoclonal antibodies, polyclonal, chimeric, single chain, bispecific, simianized, and humanized antibodies, as well as Fab fragments, including the products of a Fab immunoglobulin expression library. An intact antibody, a fragment thereof (e.g., Fab or $F(ab')_2$), or an engineered variant thereof (e.g., sFv) can also be used. Optionally, an antibody is humanized as is recognized in the art. Optionally, an antibody is not humanized. Antibodies can be of any immunoglobulin class including IgG, IgM, IgE, IgA, IgD and any subclass thereof. Illustrative examples of antibodies include antibodies that are bifunctional. Illustrative non-limiting examples of an antibody include, but are not limited to anti-CD3 mAbs (e.g. otelixizumab, teplizumab, visilizumab), anti-staphylococcus therapeutic antibodies (e.g. tefibazumab, tosatoxumab, pagibaximab, suvratoxumab, and other mAbs), antibodies for specific cell populations (F4/80—macrophages or c-kit—stem cells), antibodies against injury-associated antigens (VCAM or fibrinopeptide A), or antibodies targeting TGF-β, TNF-α, IL-6 and IL-1β, or combinations of two or more of any of the foregoing. Such antibodies are commercially available e.g. from R&D Systems (Santa Cruz, CA) or Abcam (Cambridge, MA). A bifunctional antibody may include an antibody fusion (either hybridoma fusion or produced chemically) of, as illustrative examples, an anti-CD3 antibody linked to one of the anti-staphylococcus therapeutic antibodies (e.g. tefibazumab, tosatoxumab, pagibaximab, suvratoxumab and other mAbs), monoclonal antibodies for specific cell populations (F4/80—macrophages or c-kit—stem cells) linked to monoclonal against injury-associated antigens (VCAM or fibrinopeptide A). Methods of making bifunctional antibodies are recognized in the art illustratively as illustrated in Nolan and O'Kennedy, *Biochim Biophys Acta.,* 1990; 1040(1):1-11. An antibody is optionally vitrified within a biodegradable polymer layer, a water stable polymer layer, or both. Optionally, 1, 2, 3, 4, 5, 6, or more antibodiess are present in a water stable polymer layer as provided herein.

In some aspects, a wound dressing includes VEGF, one or more AMPs, and one or more anti-inflammatory agents. Optionally, a wound dressing includes VEGF and one or more AMPs. Optionally, a wound dressing includes VEGF, one or more AMPs, and one or more fatty acids. Optionally, a wound dressing includes VEGF and insulin or an insulin derivative. Optionally, a wound dressing includes VEGF, one or more antimicrobial peptides and insulin or an insulin derivative. Optionally, a wound dressing includes VEGF, one or more antimicrobial peptides, insulin or an insulin derivative, and one or more anti-inflammatory agents.

The one or more layers (e.g. scaffold layer, time release active agent delivery layer, biodegradable layer, water stable polymer layer, etc.) may be associated by the use of one or more adhesives. The choice of adhesive depends on the desired outcome and localization of the adhesive. Illustratively, an adhesive may be localized on the periphery of a layer, or portion thereof, such that the adhesive will not appreciably interfere with transfer of one or more active agents from the wound dressing to the wound (if adhesive is not dissolvable). Optionally, an adhesive may adhere an entire layer surface, or portion thereof to an adjoining layer. Illustrative examples of adhesives include but are not limited to polyethylene glycol that is functional itself to adhere to layers together when dried, but will degrade when contacting a body fluid so as to allow desired separation of layers or portions of layers, 2-octyl cyanoacrylate (DERMABOND), or other skin glue materials as they are known in the art.

A wound dressing optionally further includes an adhesive layer that is optionally gas permeable and/or optionally dimensioned so as to be larger than the polymer layers, or extend from one or more edges of a polymer layer so as to be available to adhere the wound dressing to the desired site of action. An adhesive layer is optional and may be replaced by a tape, wrap, or other recognized method of attaching a wound dressing to the skin or site of action. Optionally, an adhesive layer is absent. An adhesive layer, if present, may be made out of any suitable material including but not limited to a woven fabric, latex, polyvinyl chloride, polyethylene, or polyurethane that may include an adhesive affixed thereto so as to allow the adhesive layer to be removably affixed to the skin.

Figure 2:
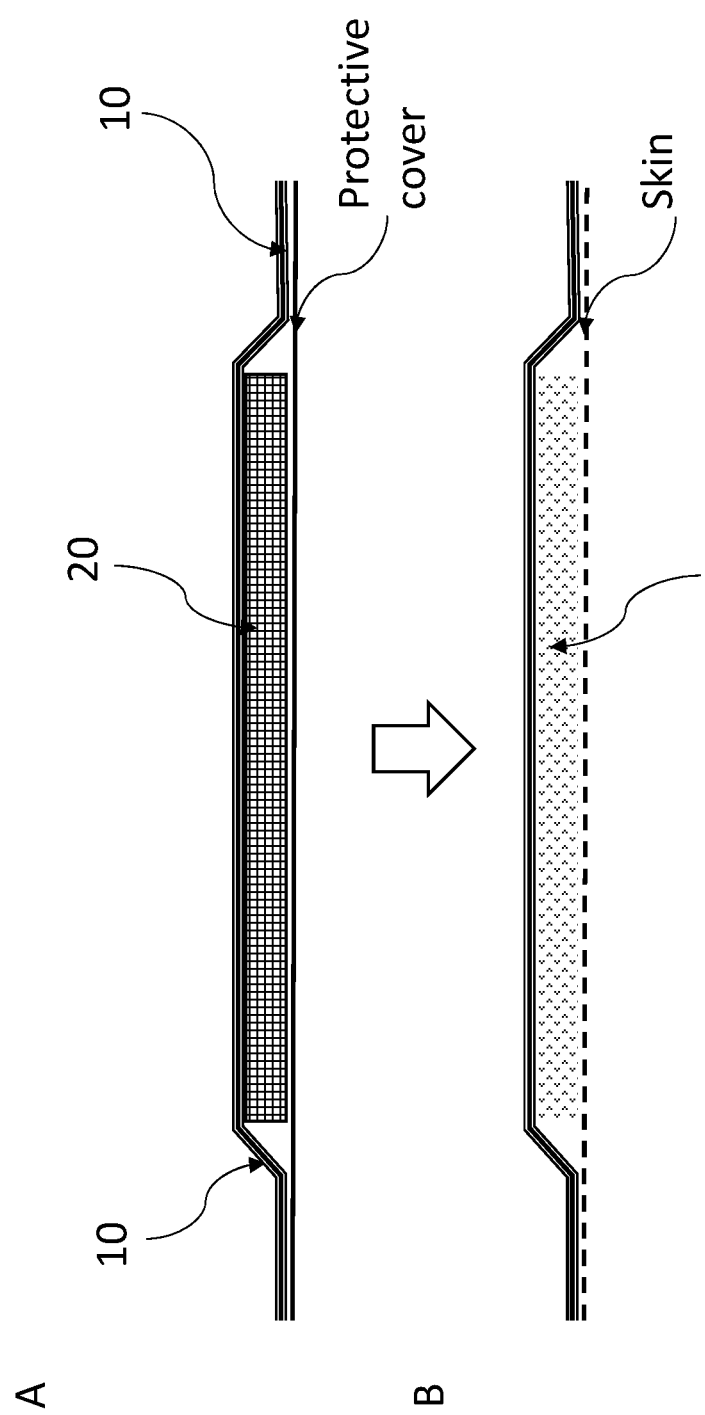
FIG. 2 illustrates an exemplary aspect of a wound dressing as provided herein (A) and dissolution of the time release active agent delivery layer following application to skin and contact to a body fluid (B)

According to an exemplary aspect, an illustrative wound dressing is illustrated in FIG. 2. A wound dressing may include an optional adhesive layer 10 that functions as an outer layer to the bandage system and may serve to adhere the wound dressing to the desired site of action such as a wound in or through the dermis or epidermis, or both, a lesion, a treatment area, or other desired location on or in the skin of a subject. An adhesive layer includes an adhesive 11, if necessary, to affix the wound dressing to the skin. Under the adhesive layer 10, is optionally one or more time release active agent delivery layers 20 positioned such that the time release active agent delivery layer may be associated proximal to the skin relative to an adhesive layer. The time release active agent delivery layer may cover the entire surface or may be presented in sections or parts as desired. The time release active agent delivery layer is therefore able to be contacted with a body fluid to allow dissolution of the vitrified active agent within the time release active agent delivery layer so as to migrate therefrom and contact a wound or other site of action with release rates controlled by the structure of the time release active agent delivery layer as otherwise described herein.

A wound dressing as illustrated in FIG. 2, or any other aspect or design, optionally further includes a protective layer 30 that may be used to maintain a clean or sterile environment of the wound dressing such as during storage or otherwise prior to application. Materials useful for a protective layer are recognized in the art.

In other aspects, a wound dressing optionally includes a releasable time release active agent delivery layer that includes a water stable polymer but may include or exclude one or more biodegradable polymers. As an example, a time release active agent delivery layer may include a water stable polymer that has sufficient porosity so as to allow cellular migration and serve as a scaffold for epithelization and promoting rapid wound healing. As such, following release of one or more active agents and degradation of any biodegradable polymer within the time release active agent delivery layer, the remaining water stable material has sufficient porosity to promote and allow cell migration and infiltration. The ability to promote cell migration serves to improve the rate and quality of wound healing promoted by the wound dressing as provided herein.

Figure 3:
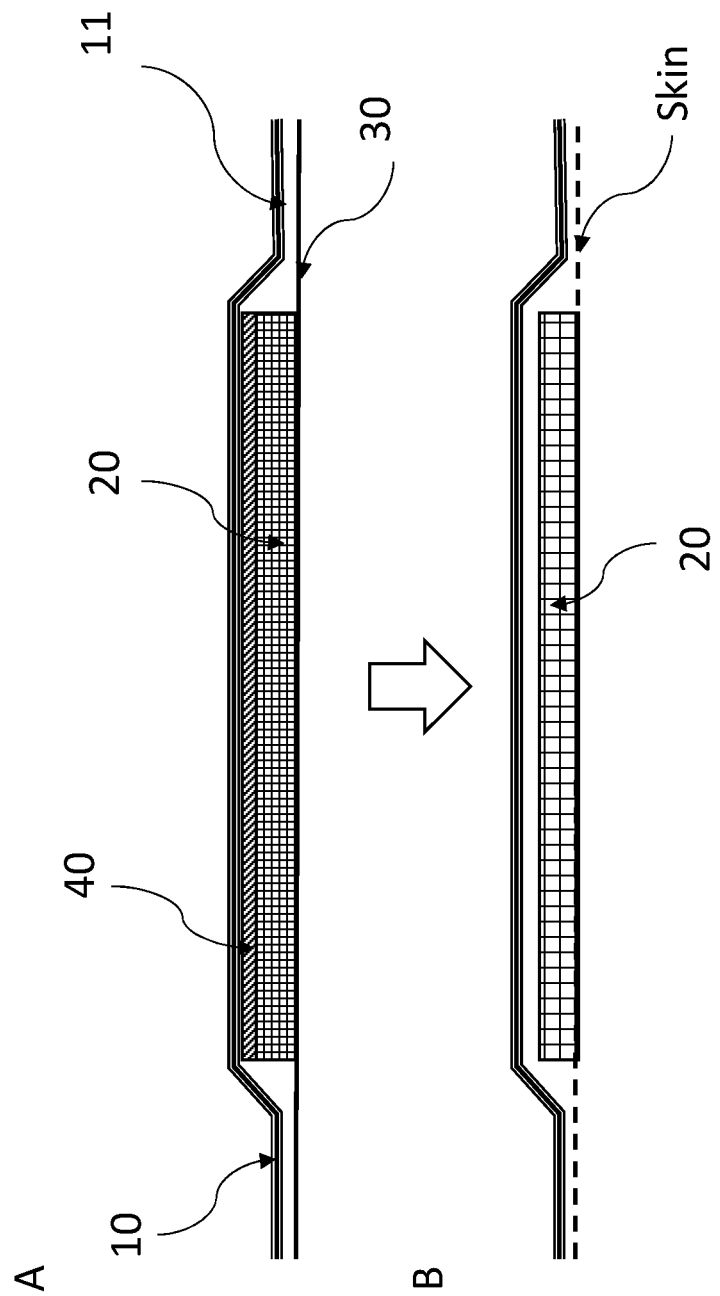
FIG. 3 illustrates an exemplary aspect of a wound dressing as provided herein (A) and release of the time release active agent delivery layer by degradation of an intermediate layer following application to skin and contact to a body fluid (B)

An illustrative wound dressing with a releasable layer is illustrated in FIG. 3A. A time release active agent delivery layer 20 is optionally attached to an adhesive layer 10, through an intermediate layer 40 that includes one or more biodegradable polymers. Upon contact with a body fluid, the biodegradable polymer of the intermediate layer is dissolved that results in a timed release of the time release active agent layer. The water stable polymer component of the time release active agent layer is thereby able to serve as a scaffold to allow cellular migration within the water stable polymer and promote wound closure and healing substantially as illustrated in FIG. 3B.

In some aspects, the time release active agent delivery layer excludes within the layer one or more biodegradable polymers. In such circumstances, a time release active agent delivery layer rapidly delivers the one or more bioactive agents directly to the site of action without a time delay other than any time required to reconstitute any vitrified material containing the one or more bioactive agents. In such circumstances, a time release active agent delivery layer may be considered a rapid release layer. Optionally, the time release active agent delivery layer includes one or more layers of biodegradable polymer so that the rate at which one or more bioactive agents is released to the site of action and/or the time to form the scaffold suitable for promoting cell migration therethrough is delayed by the time needed to degrade the biodegradable polymer layer(s) upon contact with a body fluid. Upon dissolution or partial dissolution of the biodegradable polymer, the water stable polymer is thereby able to further promote wound healing by serving as a scaffold for cell migration.

Figure 4:
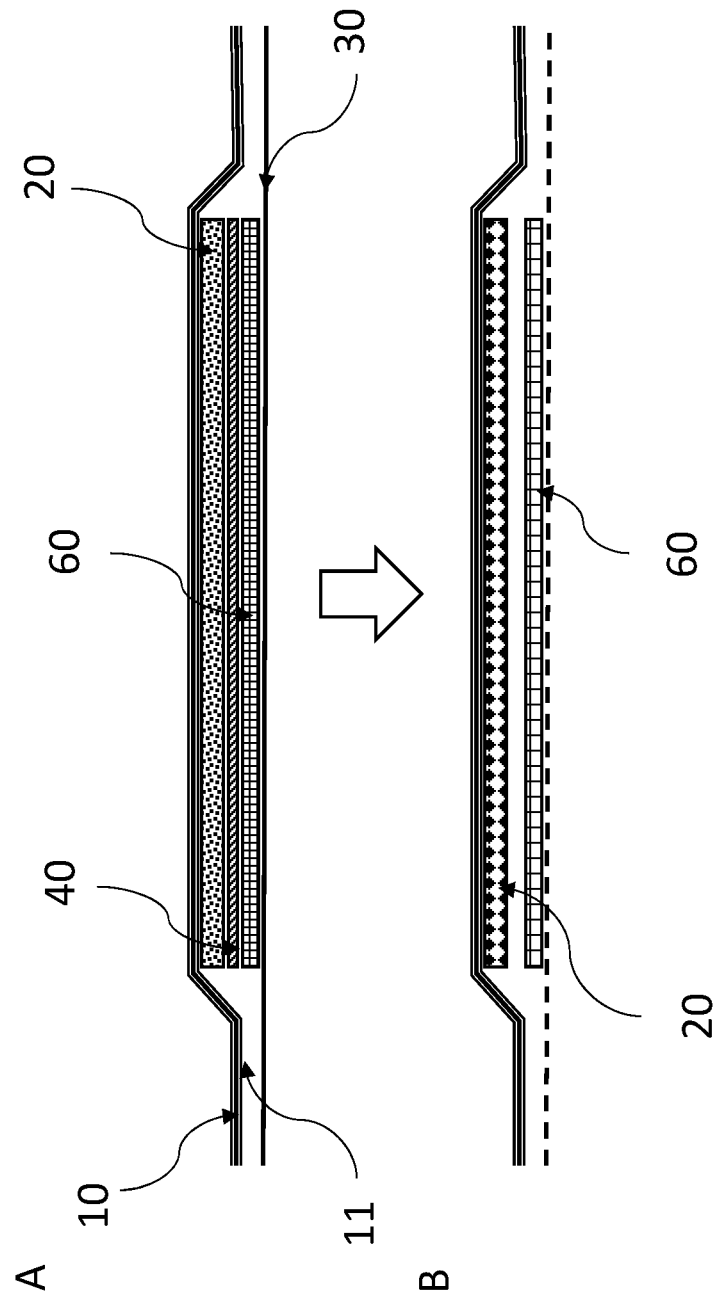
FIG. 4 illustrates an exemplary aspect of a wound dressing as provided herein (A) and release of a scaffold layer from a time release active agent delivery layer by degradation of an intermediate layer following application to skin and contact to a body fluid (B)

In another exemplary aspect of a wound dressing as provided herein and illustrated in FIG. 4A, a dressing includes a scaffold layer 60 that may include a water stable polymer that optionally further includes one or more active agents vitrified within or on the scaffold layer. The scaffold layer 60 may be associated with a time release active agent delivery layer 20 directly or by an intermediate layer 40 that includes one or more biodegradable polymers and serves as an immediate release layer. Upon contact with a body fluid, the intermediate layer 40 degrades so as to release the scaffold layer 60 so that the scaffold layer may serve as a scaffold for cell migration and promoting wound healing. The scaffold layer optionally includes one or more water stable polymers as otherwise described herein. The scaffold layer optionally includes vitrified therein or thereon one or more bioactive agents. As illustrated in FIG. 4B, upon contacting a body fluid, the vitrified active agents are released into the body fluid to elicit bioactivity depending on the type of active agent. The water stable polymer of the scaffold layer 60 is thereafter after to also remain at the wound site to serve as a scaffold and promote cell migration and optionally to prevent wound contraction during the wound healing process. The time release active agent layer 20 optionally but need not necessarily remain attached to the adhesive layer, but is free to deliver one or more bioactive agents in a time release manner depending on the characteristics of the time release active agent layer as otherwise described herein.

Figure 5:
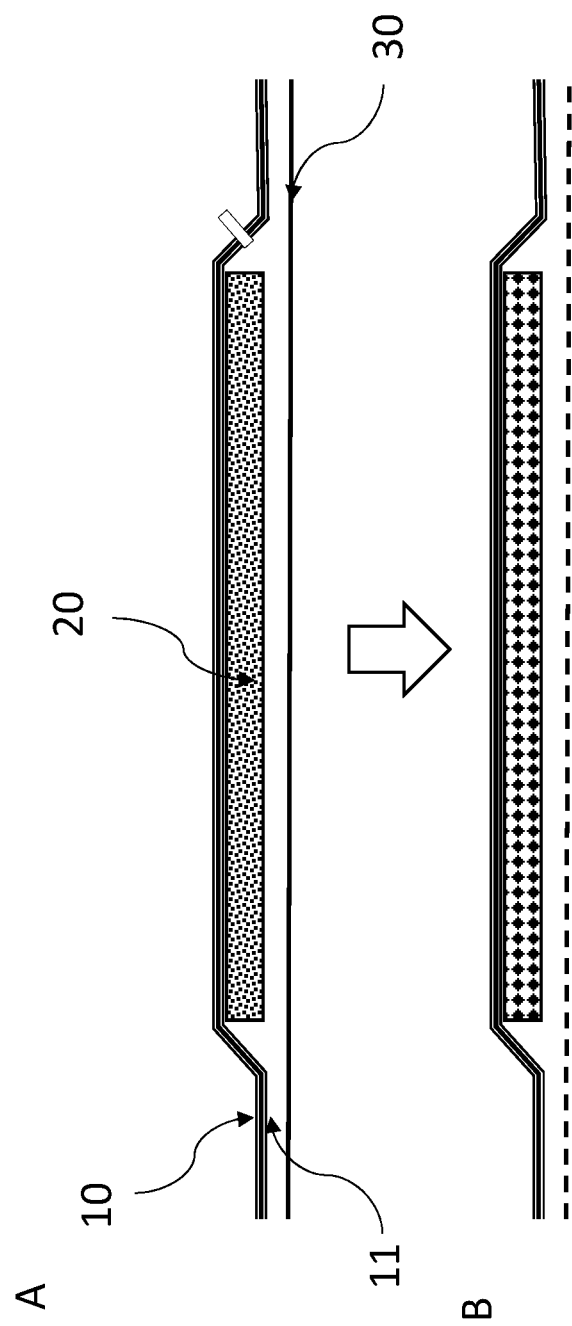
FIG. 5 illustrates an exemplary aspect of a wound dressing as provided herein (A) and dissolution of a time release active agent delivery layer by degradation of a biodegradable component layer following application to skin and contact to a body fluid (B)

In other aspects as illustrated in the example depicted in FIG. 5A, a wound dressing optionally includes a single layer in the form of a time release active agent layer. Such aspects may optionally be used following prior use of one or more other aspects as provided herein to target later desired active agents or additional active agent as was previously delivered in another aspect of a wound dressing. As such, a wound dressing optionally excludes a scaffold layer, an intermediate layer, or both. A time release active agent layer 20 is associated with an optional adhesive layer 10 so that the time release active agent layer is able to be immediately and directly associate with a wound or body fluid from a wound. As illustrated in FIG. 5B, following contact with a body fluid any biodegradable polymer in the time release active agent layer is degraded allowing the bioactive agent to be delivered. Optionally, the remaining water stable polymer in the time release active agent layer is able to further serve to promote movement of body fluid from the wound or also promote cell migration thereby further promoting wound healing.

Figure 6:
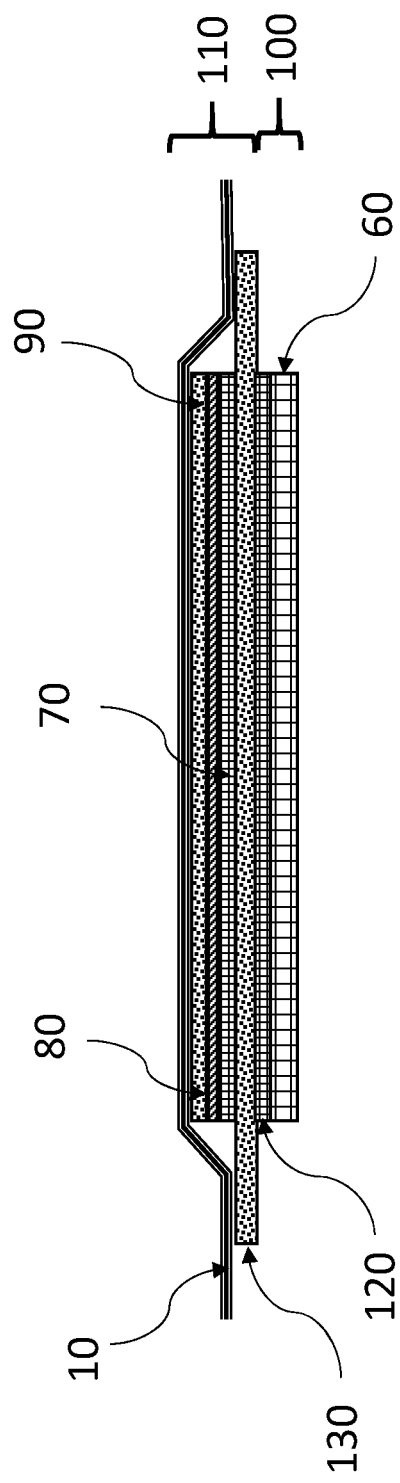
FIG. 6 illustrates an exemplary aspect of a wound dressing as provided herein including releasable scaffold layer from a non-releasable section by degradation of an intermediate layer following application to skin and contact to a body fluid, whereby the non-releasable layer includes a time release active agent delivery layer that is removable with the dressing leaving the scaffold layer behind contacting the wound.

In other aspects, a wound dressing is provided that includes a releasable portion 100 and a non-releasable portion 110 as is illustrated in FIG. 6. The releasable portion is separable from the non-releasable portion by the degradation of an immediate release layer 120 of biodegradable polymer that when degraded (e.g. dissolved) promotes separation of the releasable portion to remain at the site of a wound when the wound dressing is removed. The releasable portion, in an exemplary aspect, includes a scaffold layer 60 that is positioned most proximal to the wound relative to the dressing. A protective layer (not shown) is optionally included on the surface of the scaffold layer to protect the wound dressing prior to application to the skin of a subject. The scaffold layer 60 is affixed via an adhesive to a layer of biodegradable polymer. This biodegradable polymer is optionally present affixed by an adhesive to a layer of water stable polymer 130 that serves to retain the non-releasable portion of the wound dressing. Distal from a wound site and affixed to the water stable polymer is a time release active agent delivery layer that is depicted in this example as an associated three layers the first being a biodegradable layer 70, whereby the biodegradable layer 70 is affixed to an immediate release vitrified active agent layer 80, that is affixed to a water stable polymer layer 90 that includes one or more vitrified active agents. It is noted that the three layers forming the time release active agent delivery layer are depicted for exemplary purposes alone as there may be many additional layers or multiples of individual layers to form this portion of the exemplary wound dressing. The multi-layered time release active agent delivery layer serves to deliver one or more active agents over the course of time based on the dissolution rate of one or more vitrified drugs in the water stable polymer and the immediate release vitrified active agent layer, and controlled by the degradation of the biodegradable polymer layer. As such, a water stable polymer may include one or more active agents, the immediate release vitrified active agent layer may include one or more active agents, and the scaffold layer may include one or more active agents where the type and amount of active agent chosen at teach site is related to optimal time for the presence of each active agent to be delivered to the wound site. For example, a scaffold layer may include VEGF, one or more AMPs and/or one or more anti-inflammatory agents all for immediate release to the site of a wound. The time release active agent delivery layer may include VEGF, one or more AMPs and/or optionally one or more anti-inflammatory agents all for delayed release to the site of a wound or function with the wound. The scaffold layer may include VEGF, one or more AMPs and/or optionally one or more anti-inflammatory agents all for immediate release to the site of a wound, or function with the wound.

Alternatively, the time release active agent delivery layer may include one or more AMPs optionally covalently attached to the water stable polymer to prevent passing of the AMPs into the circulation and/or one or more anti-inflammatory agents for delayed release to the site of a wound. Optionally, the time release active agent delivery layer excludes VEGF.

Aspects of wound dressings as provided herein may employ within their structure vitrified VEGF and allow for sufficient cell migration in the wound as promoted by a time release aspect of VEGF from the wound dressing that supports the natural healing processes thereby increasing the rate and or effectiveness of natural wound healing.

A wound dressing as provided herein optionally includes vitrified VEGF. The membrane in which the VEGF is present has a degradation rate when placed into contact with a wound that both allows administration of VEGF directly to the site of action, but optionally does so at continual or time-release rate to improve effectiveness. It was found that the use of a biodegradable polymer in a layer as provided herein also creates regions of lower polymer density that allow for improved cell migration at the wound site thereby further promoting wound healing. VEGF or any functional analogue thereof may be used. Optionally, VEGF may be obtained from SIGMA-ALDRICH, St. Louis, MO VEGF is optionally human VEGF or a functional analog thereof. VEGF is optionally mouse VEGF or a functional analog thereof.

A wound dressing as provided herein optionally includes vitrified insulin. The insulin may be vitrified within one or more of the water stable polymer layers such as in a portion of the time release active agent delivery layer and/or a scaffold layer. Optionally, insulin is vitrified within an immediate release vitrified active agent layer that may be used alone or as a portion of a time release active agent delivery layer. It was found that the stability of insulin can be dramatically improved by vitrification by the processes as described herein such that cold temperature storage of the insulin or wound dressing as a whole is not required. Upon reconstitution by contact with water or a body fluid, the activity of the previously vitrified insulin is indistinguishable from fresh insulin such that its inclusion in a wound dressing as provided herein allows for optimal function and insulin delivery to a desired location such as a diabetic ulcer or other lesion as is common in subjects suffering diabetes.

Also provided are processes of treating a wound in a subject that include applying to a surface of a wound, or portion thereof, a wound dressing as provided herein. The wound dressing may be applied for a treatment time and then removed and optionally replaced. Optionally, a wound dressing is applied for a treatment time of 10 minutes of more, optionally 30 minutes or more. Optionally, a wound dressing is applied for a treatment time of or greater than 10 minutes, 20 minutes 30 minutes, 40 minutes, 50 minutes, 60 minutes, 2 hours, 3 hours, 4 hours, 5 hours, 6 hours, 10 hours, 24 hours, 2 days, or more.

In some aspects, a first wound dressing type is applied for a first treatment time followed by removal of the wound dressing (or applicable portions thereof) and application of a second wound dressing to the wound for a second treatment time. A first wound dressing and a second wound dressing may the identical or may differ in structure or constitution. As an example, a first wound dressing may be applied for a first treatment time whereby the first wound dressing includes a scaffold layer that is detachable from one or more other sections of the wound dressing. Following the first treatment time, the first wound dressing may be removed leaving the scaffold layer remaining in the skin to serve as a scaffold for cell migration.

A second wound dressing may be applied that includes a second scaffold layer or is absent a scaffold layer. The second wound dressing may be tailored to deliver one or more of the same or different active agents over a similar or different treatment time relative to a first wound dressing. As a non-limiting example, a second wound dressing may exclude a scaffold layer, but does include a time release active agent delivery layer that includes one or more active agents that is more desired at a later time of wound healing that those needed during the first treatment time.

The second wound dressing may include different or the same active agents within one or more layers relative to the first wound dressing. As an example, a first wound dressing may include in a scaffold layer VEGF, one or more AMPs, and one or more anti-inflammatory agents, as well as a time release active agent layer that includes one or more of VEGF, one or more AMPs, and one or more anti-inflammatory agents. A second wound dressing applied for a second treatment time may include one or more AMPs in a time release active agent delivery layer, but exclude VEGF as during a later treatment time antimicrobial activity may be more desirable to promoting wound healing and the presence of VEGF may be detrimental to the stage of wound healing desired during the second treatment time. In this way, the type of wound dressing and active agent(s) presented by the wound dressing may be tailored to the stage of wound healing required during the treatment time the dressing is applied to the wound.

In another example, a wound may be the result of a genetic defect or disease or condition that is chronic in the subject. A wound dressing applied for a first treatment time may be desired to promote a first stage of wound healing and a second or later wound dressing applied to deliver one or more therapeutic agents specific for treating the genetic defect or disease or condition of the subject.

Alternatively, a first wound dressing and a second wound dressing may be identical due to a genetic defect or other decease or condition of the subject necessitating long term treatment of the wound. Illustratively, a wound dressing may be applied following removal of a cancerous lesion, or simply directly applied to such a lesion absent prior excision, in a subject such as a lesion from basal or squamous cell carcinoma. Removal of the lesion may result in one or more cancerous cells remaining within the skin. Treatment with an active agent (e.g. PD-1 or PD-L1 inhibitor) designed to treat those remaining cells may be applied in a new wound dressing each day or other treatment time to ensure that any remaining cancer cells at the lesion site are treated and reducing the likelihood of reoccurrence.

A first treatment time may be continuous with a second treatment time meaning that a second wound dressing would be applied substantially immediately following removal of a first wound dressing. Optionally, treatment may be discontinuous such as when a drying period is required or other intervention to the wound may be desired.

Various aspects of the present disclosure are illustrated by the following non-limiting examples. The examples are for illustrative purposes and are not a limitation on any practice of the present disclosure. It will be understood that variations and modifications can be made without departing from the spirit and scope of the disclosure. All reagents are commercially available unless otherwise indicated, and a person of ordinary skill in the art readily understands where such reagents may be obtained.

EXAMPLES

Example 1

Formation of Polymer Fibrous Layers

Polycaprolactone (Sigma Aldrich 440744, Mn 80,000) was dissolved in organic solvent 2,2,2-Trifluoroethanol (TFE, Sigma Aldrich T63002) at a concentration of 15% w/v. Full dissolution usually takes 2 to 3 hours under room temperature stirring. The resulting polymer solution is loaded into standard 10 milliliter (mL) syringe and a 22-gauge blunt needle is used as a spinneret. Electrospinning is performed under the condition of 15 kV high voltage DC, 1.5 mL solution feeding rate, and a 15 centimeter (cm) needle tip to collector standoff. Typical spinning time is 15 to 30 minutes (mins) to obtain a membrane thickness around 100 to 200 micrometers. The spun fiber membrane is then air dry under chemical hood for 12 hours then followed by drying under vacuum for 2 hours to remove any residual organic solvent.

Under similar conditions, polyethylene oxide fibrous layers are made using high molecular weight polyethylene glycol, Sigma Aldrich 182028. A polymer solution of 5% PEO in water was formed and electrospun into a fibrous layer at 15 kV voltage, 15 cm needle to collector standoff, using a 22-gauge needle spinneret. The resulting fibrous layer is dried as above.

A collagen fibrous layer was made using similar conditions to above. Collagen (Type I, Sigma Aldrich C9791) was used to form a polymer solution of 10% Collagen in 1,1,1,3,3,3-Hexafluoro-2-propanol (HFIP). The fiber layer was formed by electrospinning using a 15 kV voltage, 15 cm needle to collector standoff, and a 22-gauge needle spinneret. The resulting fibrous layer is dried as above.

Figure 7:
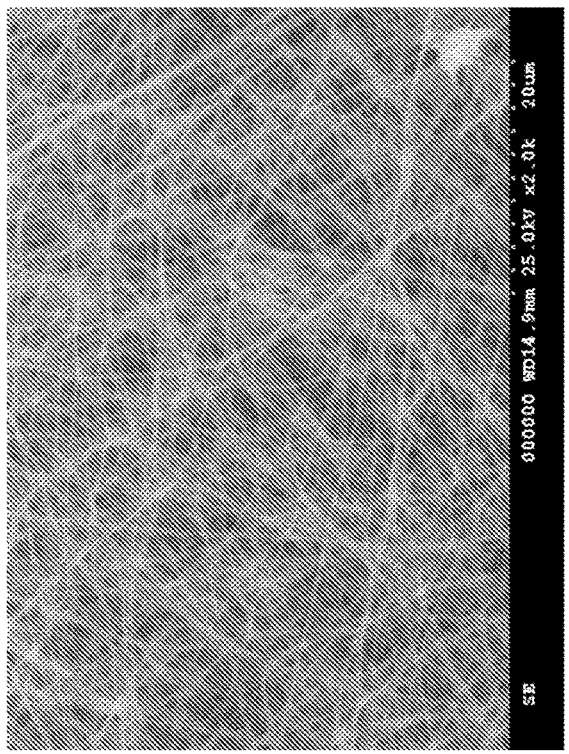
FIG. 7 illustrates the structure of a fibrous layer of water soluble polymer (A) and biodegradable polymer (B)
Figure 7:
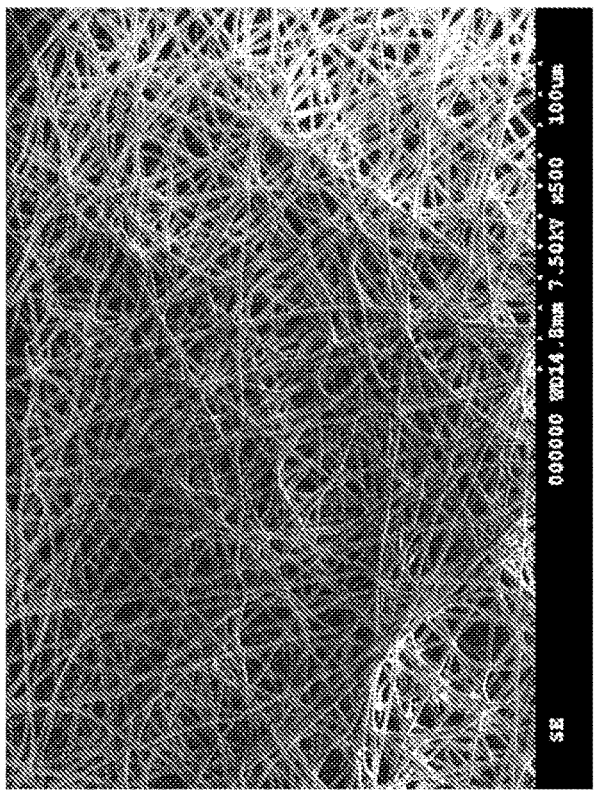

The individually dried layers are examined for fiber structure and dimensions by microscopy. Results are illustrated in FIG. 7. PCL fiber materials are illustrated in FIG. 7A demonstrating the overlapping fiber network produced by the electrospinning processes. PEO fiber networks are illustrated in FIG. 7B at higher magnification than 7A showing the relatively small fiber structure and smaller pore size.

Fibrous materials made from polylactic acid (PLA) and poly(lactic-co-glycolic acid) (PLGA) were made by the same procedures used for collagen fibrous layers using PLGA with a lactide:glycolide ration of 75:25 (molar) and a molecular weight of 76-115 kDa. The feed rate was 1 mL per hour with a 30 kV Voltage and a 15 cm standoff. Fibrous materials were of similar structure as observed by microscopy.

Example 2

Formation of Directly Vitrified Active Agent

Figure 8:
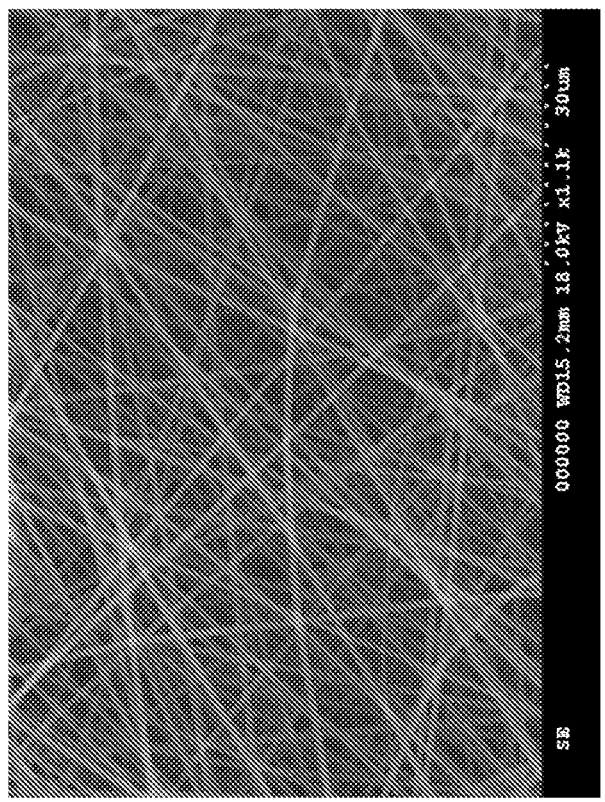
FIG. 8 illustrates the structure of a fibrous layer of vitrified insulin in pullulan.

Insulin containing active agent fibrous material that may be used as an immediate release vitrified active agent layer was made by forming a solution of insulin with 20% pullulan (Sigma Aldrich P4516) and 20% trehalose in water. The solution was electrospun into a fibrous layer of vitrified material by electrospinning the solution at a 15 kV voltage, 15 cm needle to collector standoff, and a 22-gauge needle spinneret. The resulting layer was dried and examined by microscopy as above. As is illustrated in FIG. 8, the insulin is formed into fibers whereby the insulin is vitrified and available for immediate release upon dissolution of the fibrous layer.

Example 3

Formation of Covalent Attachment of Protein to Water Stable Polymer

Figure 9:
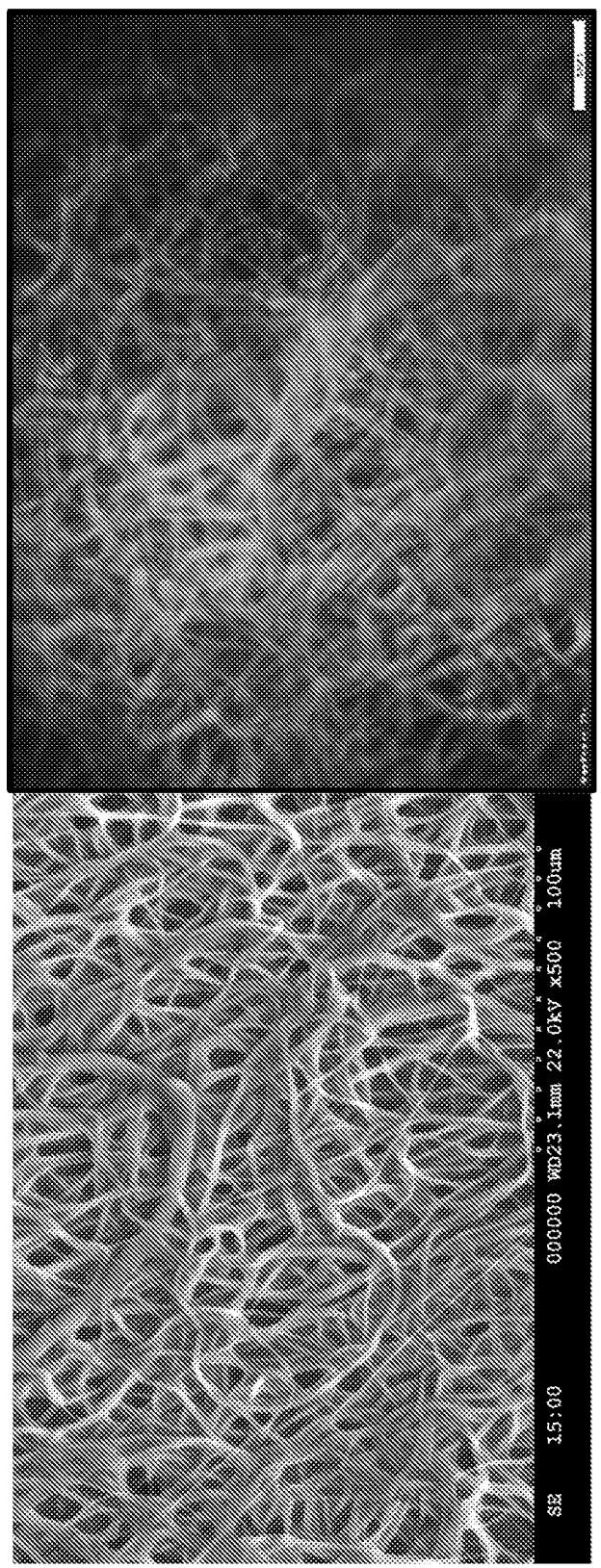
FIG. 9 illustrates covalently attached streptavidin to PCL membranes formed as described herein where (A) illustrates the PCL fiber membrane with covalently attached streptavidin, and (B) is a fluorescence microscope image illustrating the presence of covalently attached streptavidin following binding of fluorescently labeled biotinylated bovine serum albumin (BSA)

Streptavidin is covalently attached to the PCL fiber layer produced as in Example 1. Briefly, poly(ethylene glycol) diacrylate (PEG-DA, Sigma Aldrich 701963) 10% w/v, ACRL-PEG-SVA 5000 (Laysan Bio INC) 10% w/v, 2-Hydroxy-4'-(2-hydroxyethoxy)-2-methylpropiophenone (photo initiator, Sigma Aldrich 410896) 2% w/v and the streptavidin are dissolved in PBS. The solution is mixed under room temperature on shaker at speed of 150 rpm for 3 hours. During this period, all polymer dissolves in the solution and ACRL-PEG-SVA 5000 binds with the streptavidin and makes the streptavidin acrylated. After the solution is prepared, it was applied to both sides of the PCL membrane at a surface density of 0.05 to 0.1 µL/mm². The coated membrane was then subjected to UV light (365 nm wavelength, 400 µW/cm²) for UV curing. Each side of the membrane was exposed to UV for 1 min to ensure adequate curing. Then the UV cured coated membrane is washed using PBS buffer to remove any uncured or residual component. The resulting membranes were analyzed by microscopy and fluorescence microscopy following binding of fluorescently labeled biotinylated bovine serum albumin with the results illustrated in FIGS. 9A and B.

Example 4

Dissolution of Multi-Layer Fibrous Structure

A multi-layered material was formed with alternating layers of PCL and PEO. Each layer was formed by electrospinning as in Example 1. The multi-layer material was formed by switching the electrospinning source solution from the PCL solution to the PEO solution every two minutes until a 10 layer multi-layer material is produced.

Figure 10:
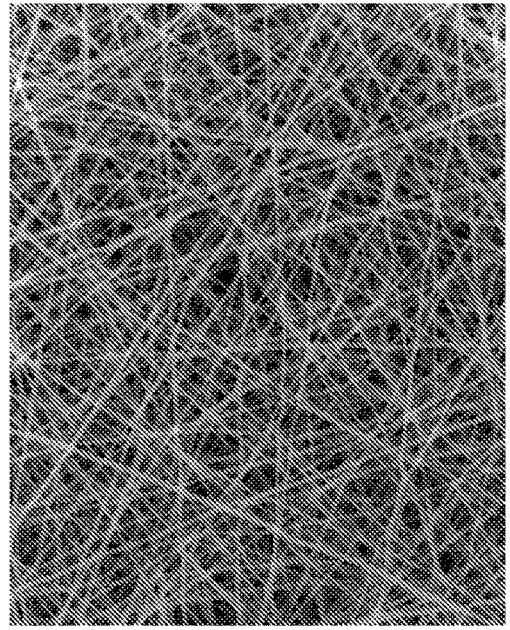
FIG. 10 illustrates dissolution of a multi-layer fibrous material made of alternating layers of PCL fibers and PEO fibers as the PEO fibers are degraded over the course of 30 minutes following immersion in buffered water.
Figure 10:
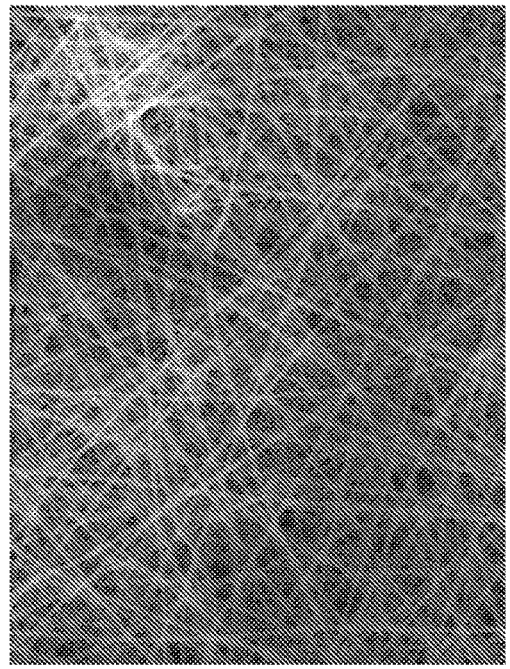
Figure 10:
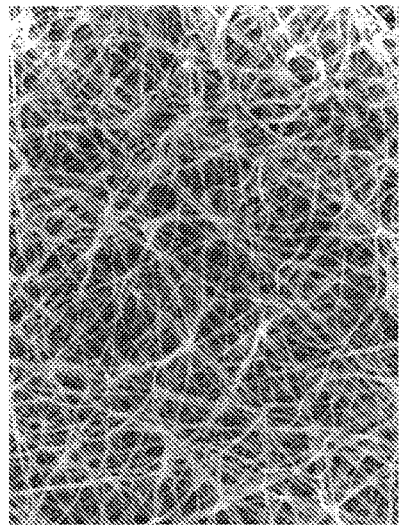
Figure 10:
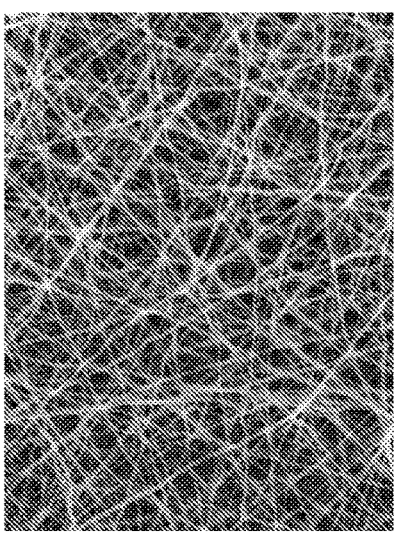
Figure 10:
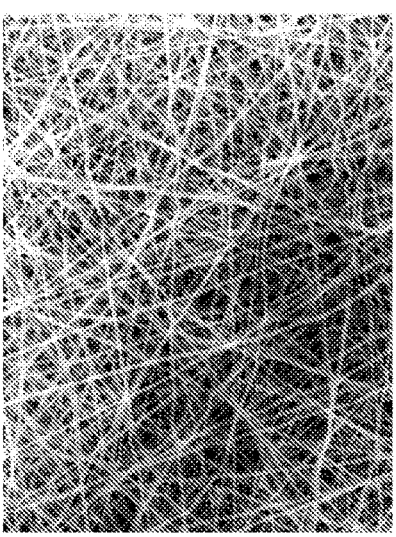

The resulting multi-layer fibrous material is subjected to dissolution testing by immersion in a solution phosphate buffered saline. Samples are removed and examined for fiber density by microscopy at 0 min, 15 min and 30 min. Results are illustrated in FIG. 10 illustrating the fibrous structure at 0 min (A), 5 min (B), 15 min (C), 30 min (D), and 60 min (E) and demonstrating the high fiber quality achieved as well as the reduction in fiber density as dissolution time increases. The PCL fiber (thick) remains intact and does not begin to degrade until 60 minutes of immersion. In contrast the PEO fiber (thin) layer is nearly completely dissolved after 5 minutes.

Figure 11:
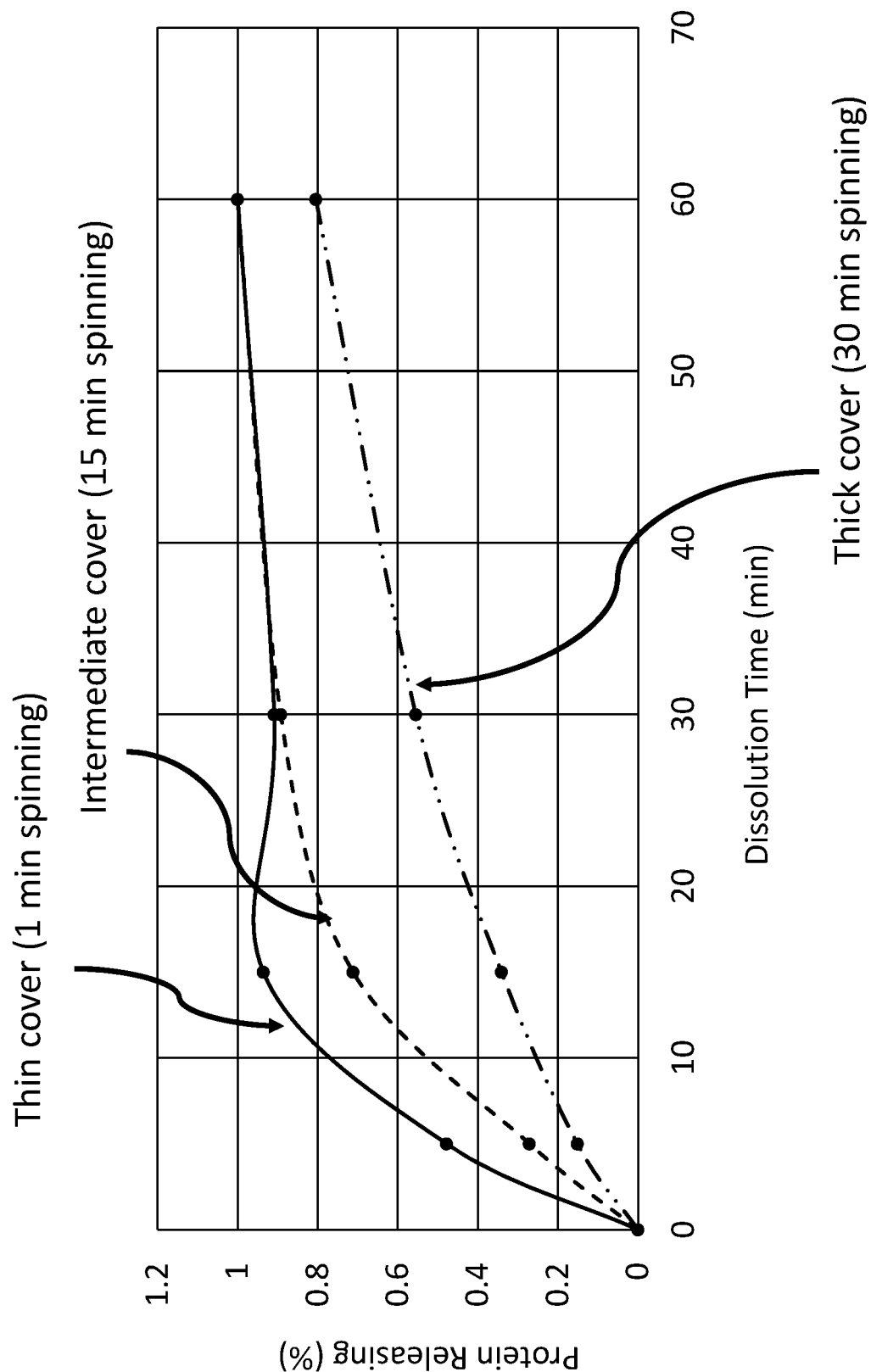
FIG. 11 illustrates dissolution of BSA from a multi-layer fibrous material according to some aspects as provided herein.

In a separate set of experiments, PEO fibrous layers are made by the same process as above, but electrospinning the PEO layer in the presence of BSA so that the BSA is entrapped in the PEO layer. A multi-layer material is made with a first layer of PCL, a second layer of PEO/BSA, and a third layer of PCL. Various thicknesses of the PCL layer are formed by electrospinning those layers for either 1 min (thin layer), 15 min (intermediate thickness) or 30 min (thick layers). The resulting multi-layered material is then subjected to dissolution in PBS as above. At various times, supernatant is removed and analyzed for the presence of free BSA in the buffer. As illustrated in FIG. 11, the presence of thicker PCL layers reduced the dissolution rate of the BSA from the dissolvable PEO layer and illustrating how varying thickness of either layer can alter dissolution rates of active agents.

Example 5

Vitrification Of Active Agents

A novel vitrification process was employed to stabilize VEGF, antibodies such as pembrolizumab, atezolizumab, and antimicrobial peptides against ambient stressors-most importantly temperature. The active agent (e.g. VEGF or pembrolizumab) was suspended in a vitrification excipient on an affinity support, which upon exposure to a reduced pressure environment entered into a glassy state. Briefly, the active agent (Sigma, St. Louis MO) 25 µg/mL in distilled water was combined with high purity, low endotoxin trehalose dihydrate obtained from Pfanstiehl (Cleveland, OH) and glycerol acquired from Sigma. Experimental solutions were stored at 4° C. All samples were placed within a vacuum chamber which was connected to an Edwards RV3 Two Stage Rotary Vane Pump (Crawley, United Kingdom) and Drierite desiccation column. The samples were then continuously dried under vacuum for a duration of 25 minutes at a pressure between −27 and −30 in Hg.

The same vitrification processes were performed using the PCL membrane produced in Example 1 as the affinity support with similar results.

Vitrified VEGF and pembrolizumab were tested for stability under the following three conditions: (1) exposure to 55° C. for one day; (2) exposure to 55° C. for 7 days; and (3) exposure to 55° C. for 15 days.

After temperature exposure, the VEGF captured on the affinity support was finally reconstituted in PBS. The as received lyophilized VEGF was stored at 55° C. for 15 days that served as the negative control to assess the VEGF activity without the proprietary vitrification at 55° C. An aliquot of non-vitrified VEGF was stored at −20° C. during the same period that served as the positive control for measuring total VEGF activity under standard recommended storage conditions as in the following examples.

Example 6

Endothelial Cell Proliferation Assay

Human umbilical vein endothelial cells (HUVECs) were allowed to serum starve for 18 hours and then replaced with media containing 2 wt % knockout serum (Lifeline Cell Technology, Caliv.) in the presence of vehicle (PBS) or VEGF (10 ng/ml) stored under standard conditions (−20° C.) or vitrified VEGF produced as in Example 3 stored at 55° C. for 1-15 days.

The storage at 55° C. was carried out to test the abilities of vitrification process to protect against the high temperature destabilization of VEGF. HUVEC cell proliferation was measured as an index to assess VEGF activity. To measure proliferation, log phase cells were plated at 4000 cells/ml in 24-well plates and allowed to adhere for 24 h. The amount of adherent cells after 24 hour (h) treatment in various media was assessed by incubating with 0.5 mg/ml dimethyl-2-thiazolyl blue tetrazolium bromide (MTT) (Sigma-Aldrich) diluted in fresh serum-free culture medium at 37° C.

After 4 h, the MTT reagent was aspirated from each well and the formazan product was solubilized in 200 µl of DMSO. The absorbance of each sample was measured at 500 and 650 nm using a SpectraMax M5 microplate reader (Molecular Devices) and the percent cell proliferation was calculated from the absorbance (500-650 nm) and expressed relative to vehicle (PBS)-treated cells by considering the PBS control as 100% proliferation.

Figure 12:
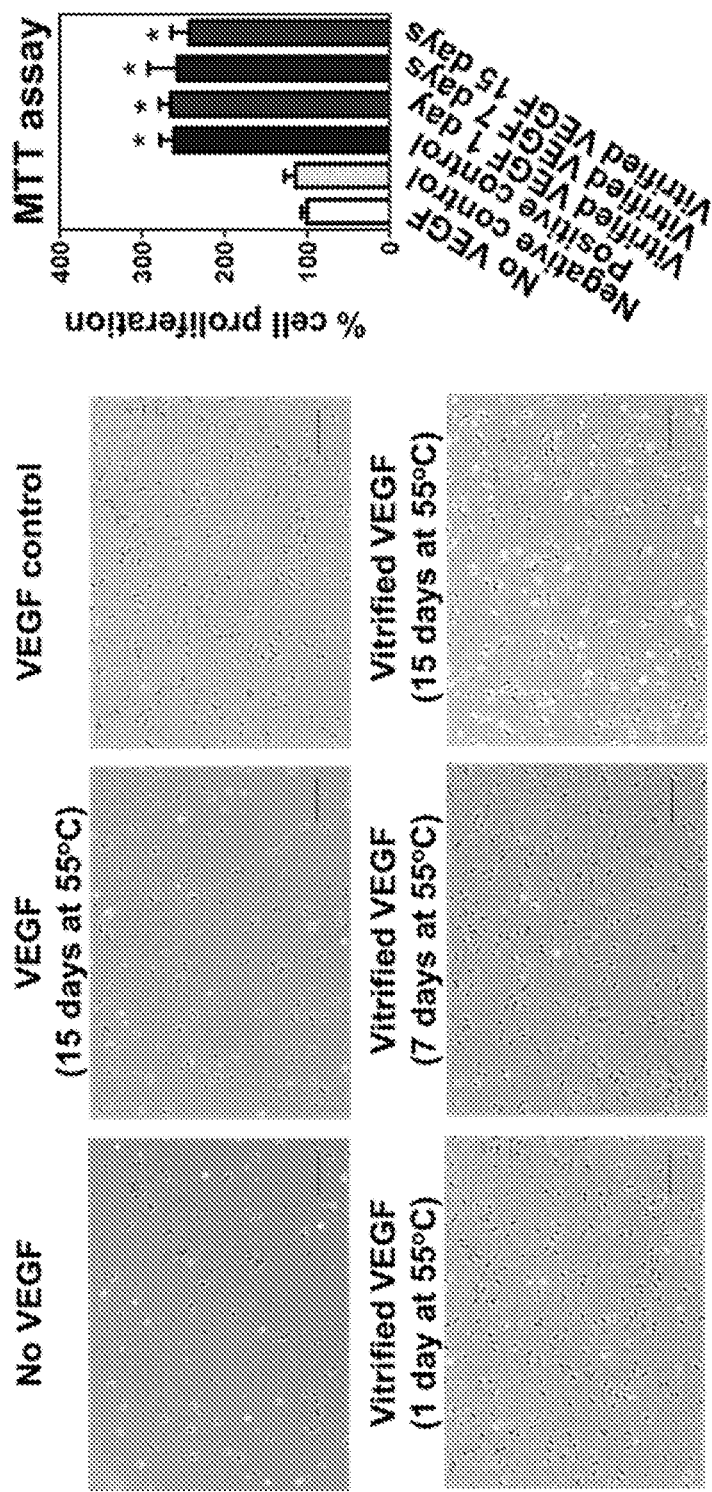
FIG. 12 illustrates that vitrification of VEGF results in excellent high temperature and time stability as demonstrated by endothelial cell proliferation assays.

As illustrated in FIG. 12, healthy cells established cell-cell contacts in vitrified VEGF treated groups compared to the sparse numbers of single cells with no cell-cell contacts in non-vitrified VEGF when stored at 55° C. Scale bar=200 mm.

The results also demonstrate that the effects of vitrified VEGF stored at 55° C. are equivalent to VEGF stored under proper storage temperature (−20° C.). Notably, exposure of non-vitrified VEGF to 55° C. led to a complete loss of VEGF activity to levels equivalent to no VEGF control in promoting cell proliferation.

The results from the MTT assay (right of FIG. 12) demonstrate the effect of vitrified VEGF stored at 55° C. for 1, 7 and 15 days compared to non-vitrified VEGF stored at 55° C. for 15 days are significantly higher while the differences between No VEGF and non-vitrified VEGF stored at 55° C. are not significantly different. The effects produced by VEGF stored under proper temperature (−20° C.) are not statistically significant from the effects produced by vitrified VEGF stored at 55° C. All values represent the mean±SEM, n=3. *, $p<0.05$.

Example 7

Endothelial Cell Tube Formation Assay

Endothelial Cell Tube formation on a Matrigel was assessed to measure the angiogenic potential of vitrified VEGF. The growth factor-reduced Matrigel (Corning Life Sciences; 289 ml per well) was coated onto glass coverslips in 24-well plates, which were placed at 37° C. for 30 minutes to allow gelification.

HUVECs grown in VascuLife complete medium were used within 2 passages for the tube formation assay. After trypsinization, HUVECs at passage 2 were re-suspended in Vasculife basal medium containing 2% knockout serum (Lifeline Cell Technology, CA) and plated gently over the gel matrix at a cell density of 60,000 cells/well in 300 ml media containing vehicle (PBS) or VEGF (10 ng/ml) stored under standard conditions (−20° C.) or vitrified VEGF (10 ng/ml) stored at 55° C. for 1-15 days.

The plates were incubated at 37° C. for 8 h. Tube formation in each well was imaged using an inverted phase contrast microscope (Nikon Instruments) and the number of loops/mm$^2$, branching points/mm$^2$ and the average length of loop (mm) were quantified using ImageJ software.

Figure 13:
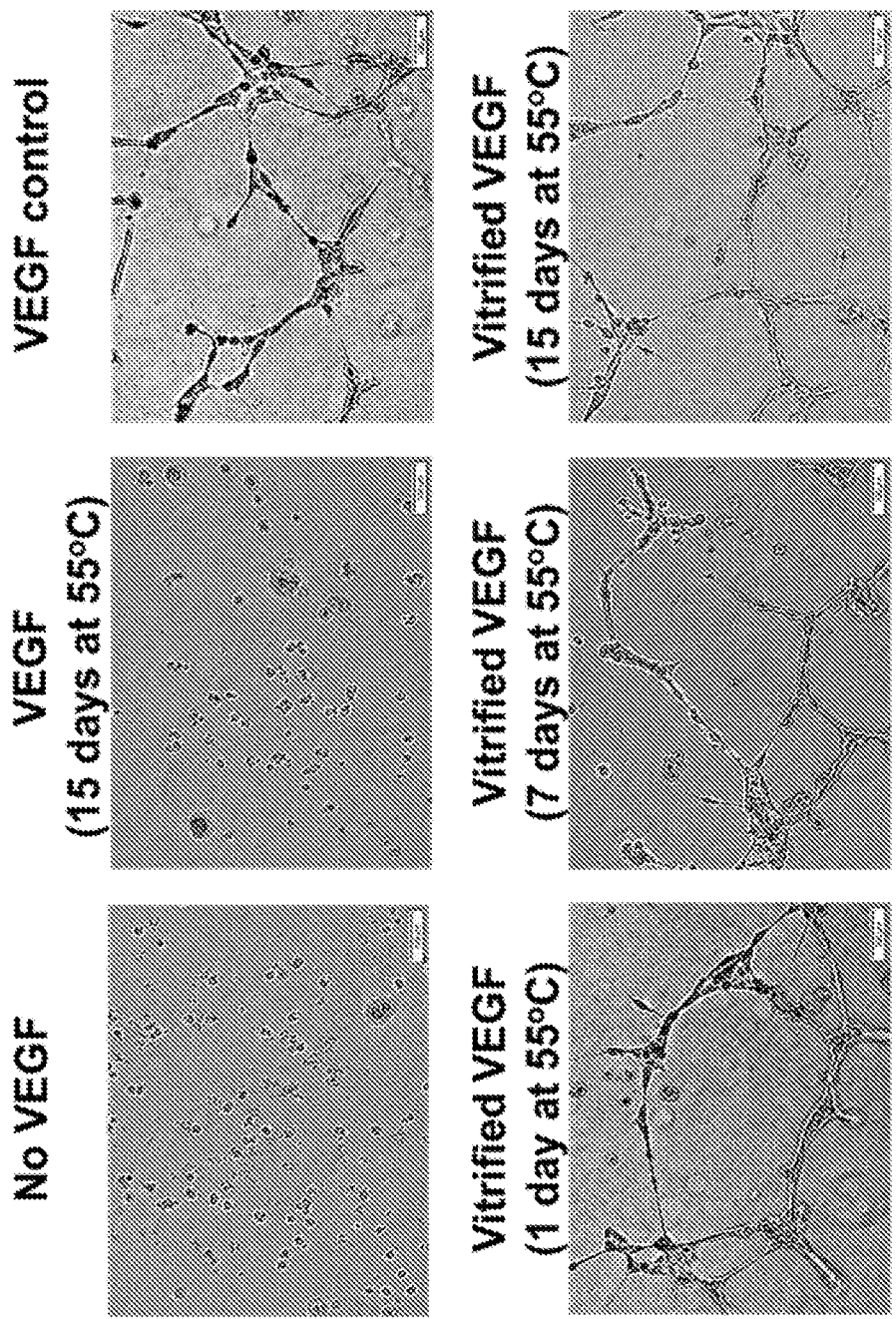
FIG. 13 illustrates that vitrified VEGF stored at 55° C. efficiently promotes tube formation of endothelial cells in culture when compared to non-vitrified VEGF.

As illustrated in FIG. 13, vitrified VEGF stored at 55° C. efficiently promotes tube formation of endothelial cells in culture when compared to non-vitrified VEGF. The effects of vitrified VEGF stored at 55° C. were also shown to be equivalent to standard VEGF stored under proper storage temperature (−20° C.). Notably, exposure of non-vitrified VEGF to 55° C. led to a total loss of tube formation similar to those seen with No VEGF control.

Figure 14:
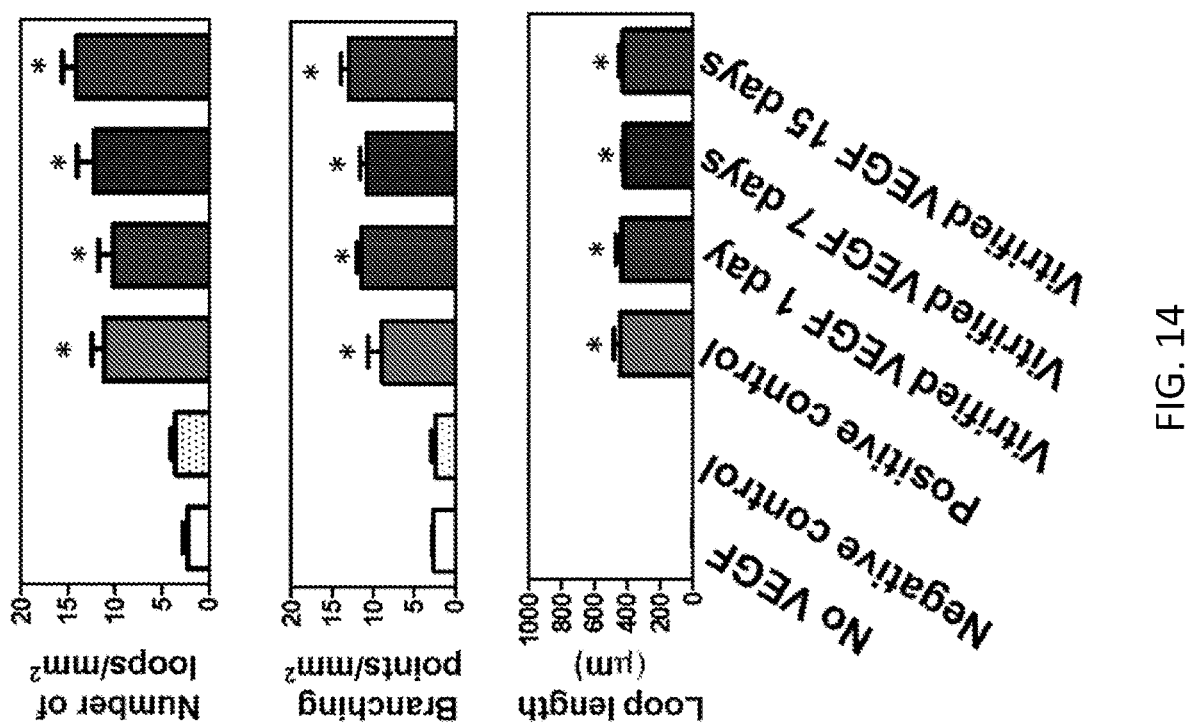
FIG. 14 illustrates that vitrified VEGF stored at 55° C. efficiently promotes tube formation of endothelial cells in culture when compared to non-vitrified VEGF as quantified for tube formation by number of loops (A), branching points (B) and length of loops (C)

FIG. 14 also demonstrates the promotion of tube formulation. For example, this figure provides quantification showing the effect of vitrified VEGF stored at 55° C. for 1, 7 and 15 days in inducing the number of loops (A); branching points (B); and the length of loops (C). Notably, when compared to non-vitrified VEGF stored at 55° C., each of these were significantly higher while the differences between No VEGF and non-vitrified VEGF stored at 55° C. are not significantly different.

The effect produced by VEGF stored under proper temperature (−20° C.) are not statistically significant from the effects produced by vitrified VEGF stored at 55° C. All values represent the mean±SEM, n=3. *, $p<0.05$ versus negative control (VEGF 15 days at 55° C.).

Example 8

Mouse Cutaneous Wound Healing Model

C57/BL6J female mice (n=5) were treated with the adenovirus encoding a soluble form of Flk1 (sFlk1) to inhibit VEGF action, and age-matched control mice (n=5) were treated with the control virus expressing the Fc alone.

Twenty-four hours after virus injection, two full-thickness excisional wounds (0.8 cm in diameter) were created on the back of each mouse using a disposable skin punch biopsy tool. Analyses of wound closure was assessed by measuring the wound size with a digital camera on day 0 and 9. At the end of day 9, skin samples were collected for standard histological analyses of healing process by hematoxylin & eosin (H&E) staining method.

The percent wound healing was calculated by measuring the distance between the wound edges on the sections of AdFc control and AdFlk-treated groups at the end of 9 days. A separate piece of tissue was collected, prefixed in 4% paraformaldehyde and used for cryosectioning in a conventional cryostat. A 10 mm section was used for staining with CD31 an endothelial cell marker and the CD31 stained sections were mounted and examined on a Zeiss Axioskop 2 microscope equipped with a Zeiss AxioCam camera for fluorescence imaging.

The capillary density was assessed by counting the number of CD31 stained cells/field and expressed as % CD31 relative to the total number of nucleated cells measured by nuclear stain DAPI in each field.

Figure 15:
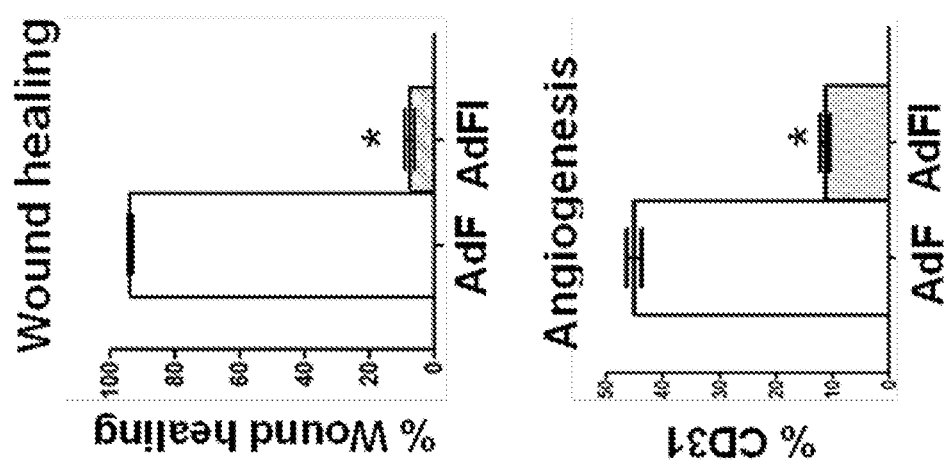
FIG. 15 illustrates that VEGF plays a critical role in angiogenesis and re-epithelization during cutaneous wound healing quantified by lesion size or CD31 levels.

As illustrated in FIG. 15, VEGF plays a critical role in angiogenesis and re-epithelization during cutaneous wound healing. A dramatic delay in cutaneous wound closure was observed following blockade of VEGF action by AdFlk1 treatment. In addition, complete blockade of reepithelization of wounds in AdFlk1-treated mice and the dramatic suppression of vascular density (angiogenesis) in AdFlk1-treated mice was observed as evidenced by significant decrease in CD31-positive immunostained vessels. *P<0.05; student's t test; n=5 mice/group.

Example 9

Transwell Migration and Scratch Wound Healing Assays

Two established cell culture models of transwell migration and a scratch wound healing model with freshly isolated C57/BL6J mouse keratinocytes were used. First, the keratinocyte cultures were established by enzymatic separation of keratinocytes from the epidermal layer of mouse skin using a dispase (for isolating epidermal later of skin) and trypsin (for isolating keratinocytes from the epidermis) under gentle agitation. The collected cells were grown in SFM-keratinocyte medium (Life Technologies).

To assess the ability of keratinocytes to migrate under the influence of VEGF, cells were trypsinized, collected by centrifugation and added to the upper chamber of transwell inserts while the No VEGF control or VEGF or VEGF+ VEGF inhibitor were added to serum free medium placed in the lower chamber. The cells were allowed to migrate under normal growth conditions. At the end of 24 h, the cells that migrated under the influence of vehicle control or VEGF in lower chamber were counted visually and expressed as percent cell migration.

To assess the ability of keratinocytes to migrate and heal wound gaps, scratch wounds of uniform dimensions were created across keratinocyte monolayers and the cultures were left for healing in the presence or absence of VEGF or VEGF inhibitor.

Figure 16:
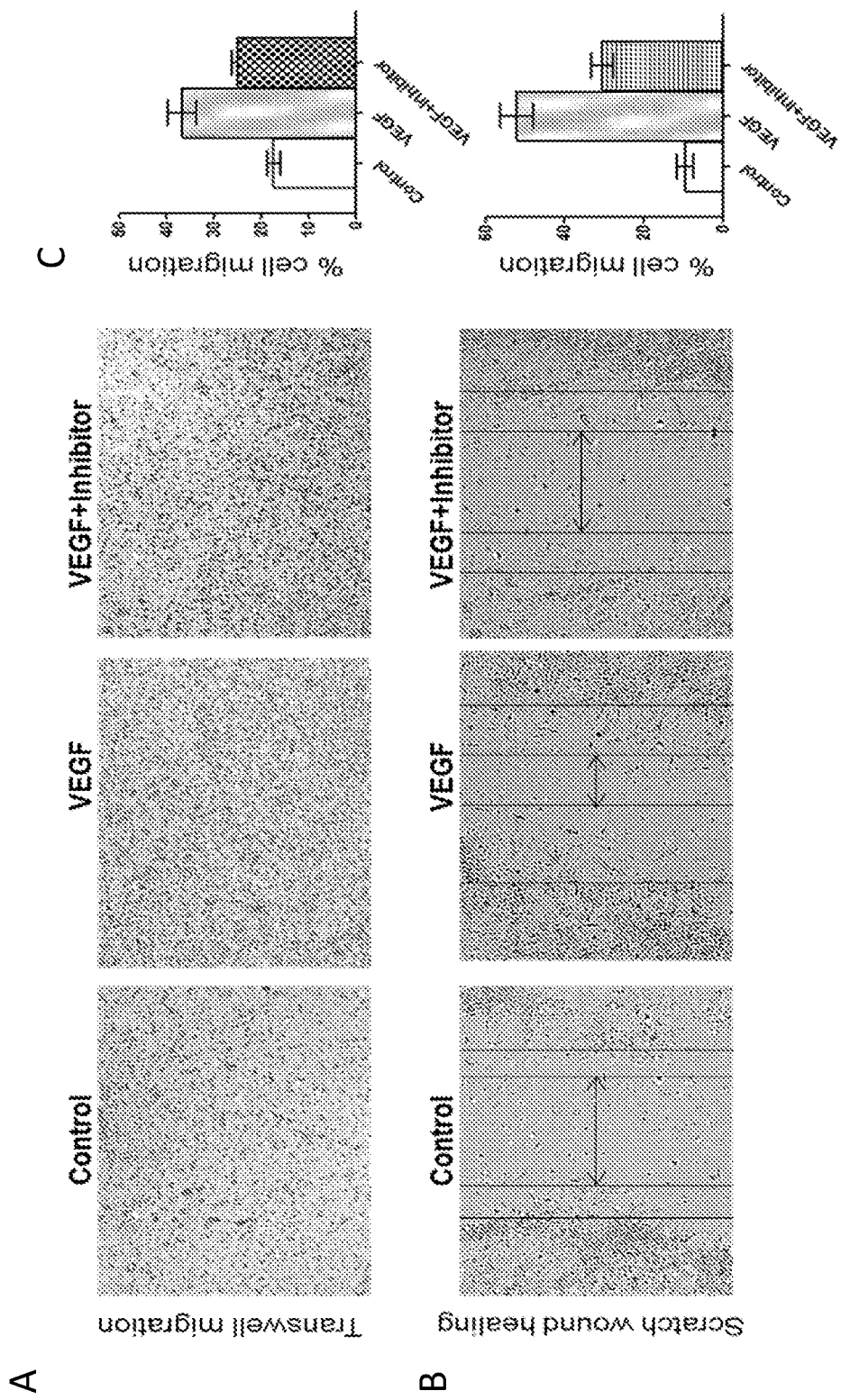
FIG. 16 illustrates the VEGF stimulates migration of keratinocytes in both transwell migration (A) and scratch wound healing assays (B) and quantified in (C)

As illustrated in FIG. 16, VEGF stimulates migration of keratinocytes in both transwell migration and scratch wound healing assays. FIG. 16A provides results from a transwell migration assay indicating the migratory response of keratinocytes to the angiogenic inducer VEGF. The specificity of VEGF actions on the keratinocyte culture was confirmed by blocking the response with a VEGF inhibitor. FIG. 16B provides results from a wound healing assays with uniformly created scratch wounds on confluent monolayers derived from cultured keratinocytes indicating that VEGF with its keratinocyte migration ability enables the recruitment of keratinocytes into the wound gap and promote a dynamic healing in the scratch wound area. The specificity of VEGF actions on the keratinocyte scratch wound healing was confirmed by blocking the response with a VEGF inhibitor. FIG. 16C provides the quantification of cell numbers in the transwell migration assay and the number of cells that migrated into the scratch wound area revealed a dramatic induction of keratinocyte migration by VEGF that was significantly inhibited by a specific VEGF inhibitor. *P<0.05; student's t test; n=3.

Example 10

Lps-Induced Scar-Forming Gene Expression Assay of Dermal Fibroblasts

Dermal fibroblasts were treated with lipopolysaccharide LPS (500 ng/ml) or vehicle PBS (No LPS control) for 3 days in the presence of vitrified VEGF (10 ng/ml) that was tested for stability against exposure to 55° C. from days 1-15.

LPS-treated cells exposed to VEGF (10 ng/ml) that underwent thermo-destabilization in the absence of vitrification served as negative control and the cells treated with VEGF that was subjected to neither vitrification nor destabilization served as positive control.

LPS-induced scar-forming gene expression profiles of dermal fibroblasts namely TNFα, COL1A1, DSTN, TGFβ, IL-6 and COL3A1 were measured by quantitative real-time PCR (qPCR), normalized to the expression of β-actin and expressed relative to the levels measured in No LPS control.

Figure 17:
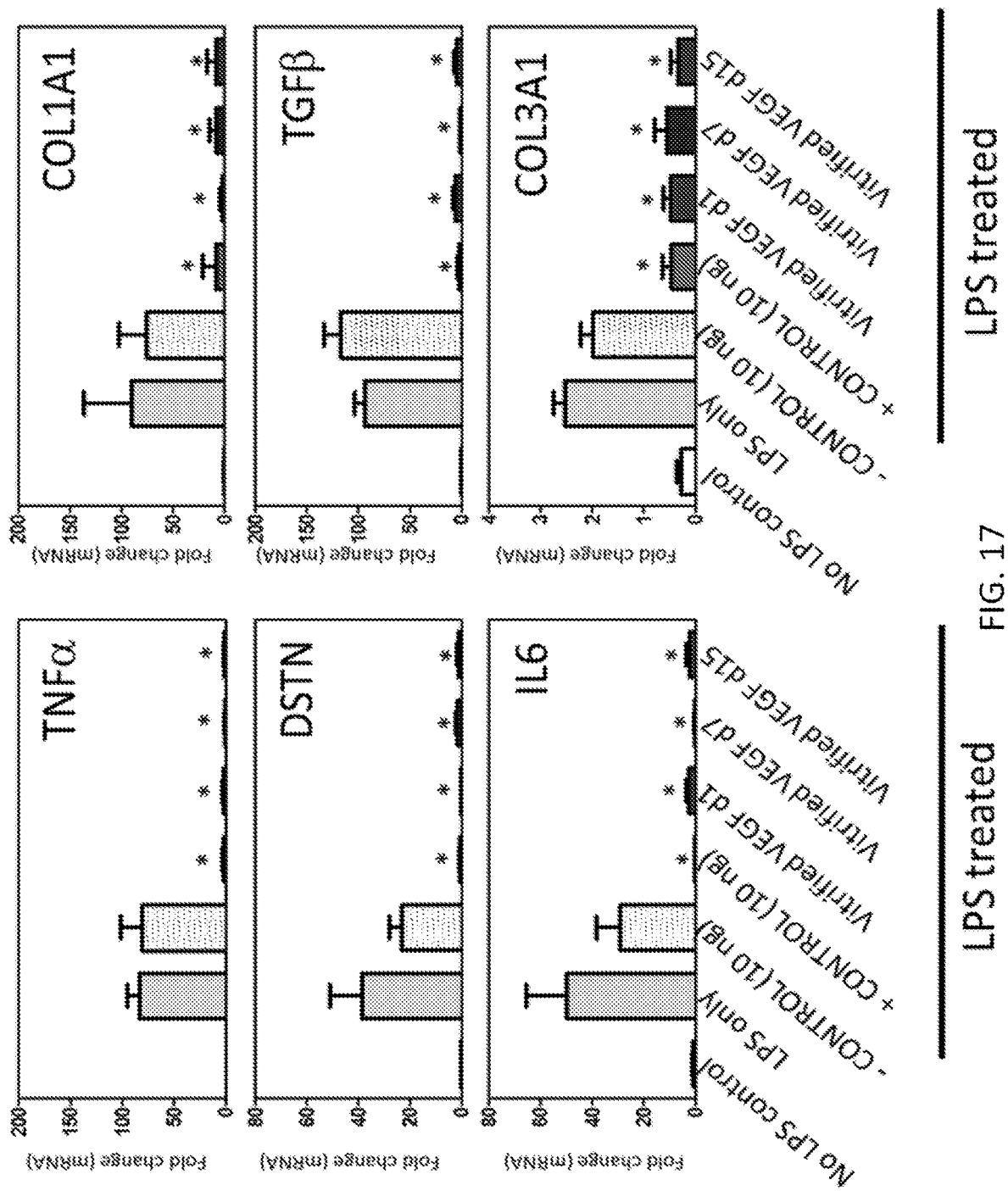
FIG. 17 illustrates that vitrified VEGF induces a strong suppressive effect on scar forming genes.

As illustrated in FIG. 17, VEGF under ideal storage conditions (+ control) induced a strong suppressive effect on scar forming genes. This effect was completely reproduced by vitrified VEGF but not by VEGF without vitrification when exposed at 55° C. for 15 days indicating that vitrification stabilization of VEGF preserves its anti-scarring activities enabling wound healing in the absence of ideal storage conditions.

All values represent the mean±SEM of three independent replicates. *p<0.05 compared to LPS only or negative control.

Example 11

Antimicrobial Peptides

Antimicrobial peptides (AMPs) exhibit broad spectrum antimicrobial activity. AMPs have multiple cellular targets and this makes it difficult for microbes to develop resistance against them as compared to antibiotics which mostly have a single target. Furthermore, AMPs also exert several immunomodulatory properties such as modulation of cytokine and chemokine expression, leukocyte activation etc. AMPs also play a role in other biological processes such as angiogenesis and wound healing. Few of the reasons for their failure are in vitro and in vivo stability, efficiency and toxicity.

To provide ambient temperature stability, peptides were vitrified in a disaccharide excipient containing trehalose and glycerol on a polycaprolactone (PCL—a biodegradable polyester) membrane (formed as in Example 1). To provide broad spectrum antibacterial, antifungal, and antiviral activity, the peptide Plm [Mol. Wt.–2024.60 Da] with N-terminal amino-lauric acid and C-terminal amide conjugation were synthesized commercially (Peptide2, USA) using solid phase F-moc chemistry and purified by reverse-phase high performance liquid chromatography to a purity of >95%.

The N & C-terminal modifications were carried to improve the activity and stability of the peptides. The vitrified samples were stored at room temperature as well as 55° C. for different lengths of time. Non-vitrified peptides stored at −20° C. and 4° C. were used as control in the following Examples.

Example 12

Radial Diffusion Infection Assay

Two layer Luria-Bertani (LB)-agarose plates were utilized to perform radial diffusion assays and assess the antimicrobial efficacy of the vitrified anti-microbial peptides as well as the control peptide.

Wells of 0.5 inch diameter were cut through the first layer. 2500 CFU of *Bacillus subtilis* (gram positive bacterium) bacteria were added to the wells. The first well was covered with a PCL membrane without any peptide and 150 ml of PBS was added for hydration. Well number 2, 3 and 4 contained different concentrations of peptides and 150 ml of PBS.

Note that the control peptides were added onto the membrane prior to the placement whereas the vitrified peptides were stored on the membranes during the vitrification process. The samples were kept at 37° C. in a moist incubator for 18 hours.

Figure 18:
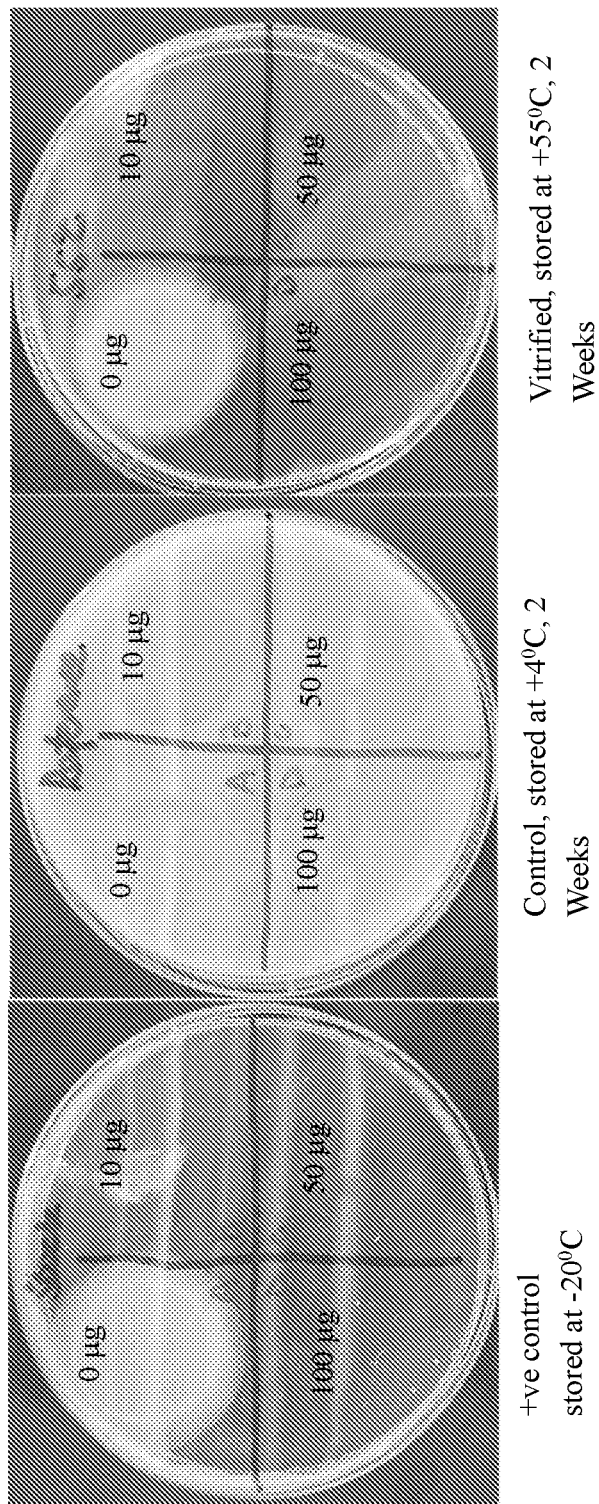
FIG. 18 illustrates that vitrified antimicrobial peptides are functional to eliminate microbial growth following two weeks of storage at 55° C.

As illustrated in FIG. 18, the vitrified peptides after two weeks storage at 55° C. provided equivalent antimicrobial activity to the control peptide stored at −20° C. Notably, the control peptide stored at 4° C. in a refrigerator was completely denatured after two weeks and did not exhibit any antimicrobial activity.

Figure 19:
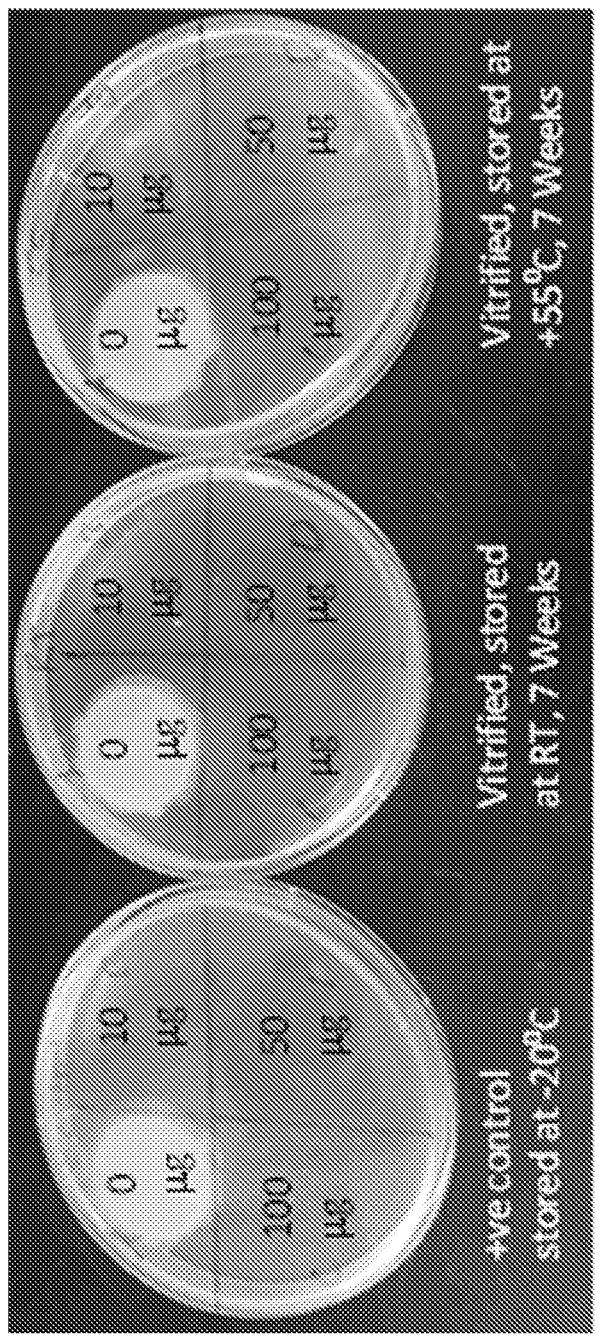
FIG. 19 illustrates that vitrified antimicrobial peptides are functional to eliminate microbial growth following seven weeks of storage at 55° C.

FIG. 19, demonstrates that the vitrified peptides were stable even after 7 weeks of storage at 55° C. and provided equivalent antimicrobial activity to the control peptide stored at −20° C. Thus, vitrified peptides embedded in a wound dressing can remain stable at ambient temperature and provide antimicrobial protection.

REFERENCES

1. Bao P, Kodra A, Tomic-Canic M, Golinko M S, Ehrlich H P, Brem H. 2009. The role of vascular endothelial growth factor in wound healing. J Surg Res. 2009 May 15;153 (2):347-58. 2008.04.023. Epub 2008 May 12. Review 2. Wietecha M S, DiPietro L A. 2013. Therapeutic approaches to the regulation of wound angiogenesis. Adv Wound Care (New Rochelle). 2(3):81-86. Review.

3. Frank S, Hubner G, Breier G, Longaker M T, Greenhalgh D G, Werner S. 1995. Regulation of vascular endothelial growth factor expression in cultured keratinocytes. Implication for normal and impaired wound healing. Journal of Biological Chemistry 270(21):12607-13

4. Jacobi J, Tam B Y, Sundram U, von Degenfeld G, Blau H M, Kuo C J, Cooke J P. 2004. Discordant effects of a soluble VEGF receptor on wound healing and angiogenesis. Gene Ther. 11(3):302-9.

5. Hideyuki Mlizumachi, Hiroyuki Ijima. 2013. Measuring Stability of Vascular Endothelial Growth Factor using an Immobilization Technique. Advanced Biomedical Engineering 2: 130-136.

The compositions and methods described herein are presently representative of exemplary aspects, and not intended as limitations on the scope of the invention. Changes therein and other uses will occur to those skilled in the art. Such changes and other uses can be made without departing from the scope of the invention.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

Various modifications of the present invention, in addition to those shown and described herein, will be apparent to those skilled in the art of the above description. Such modifications are also intended to fall within the scope of the appended claims.

Patents, publications, and applications mentioned in the specification are indicative of the levels of those skilled in the art to which the invention pertains. These patents, publications, and applications are incorporated herein by reference to the same extent as if each individual patent, publication, or application was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A wound dressing device comprising:
a time release active agent delivery layer, the time release active agent delivery layer comprising a water stable polymer and a biodegradable polymer, the water stable polymer comprising one or more active agents in the form of a stable glassy vitrified material in contact with the water stable polymer, the time release active agent delivery layer configured such that the biodegradable polymer may release one or more active agents to a wound site over the course of a treatment time, wherein the one or more active agents comprise an antimicrobial peptide, an antibody, a growth factor, insulin, or combinations thereof.

2. The device of claim 1 wherein the water stable polymer and the biodegradable polymer are present in interwoven alternating layers.

3. The device of claim 1 wherein the water stable polymer and the biodegradable polymer are interwoven throughout the time release active agent delivery layer.

4. The device of claim 1 wherein the water stable polymer comprises collagen, polycaprolactone, polylactic acid, poly (lactic-co-glycolic acid), or combinations thereof.

5. The device of claim 1 wherein the biodegradable polymer dissolves by 50 weight percent or greater in water over at least 30 minutes.

6. The device of claim 1 wherein the biodegradable polymer comprises ethylene oxide, a polysaccharide, or combinations thereof.

7. The device of claim 1 wherein the biodegradable polymer comprises polyethylene oxide, pullulan, or combinations thereof.

8. The device of claim 1 wherein the time release active agent delivery layer comprises two or more active agents, and wherein a first active agent and a second active agent are different active agents.

9. The device of claim 1 wherein the one or more active agents are covalently bound to the water stable polymer.

10. The device of claim 1 wherein the time release active agent delivery layer comprises two or more active agents, wherein a first active agent is covalently bound to the water stable polymer, and a second active agent is not covalently bound to either the water stable polymer or the biodegradable polymer.

11. The device of claim 10 wherein the second active agent is a growth factor, insulin, an antibody, an anti-inflammatory agent, or combinations thereof.

12. The device of claim 1 further comprising an adhesive layer, an immediate release layer, or both an adhesive layer and an immediate release layer, the immediate release layer associated with the time release active agent delivery layer opposite the adhesive layer when said immediate release layer is present.

13. The device of claim 12 wherein the device comprises the immediate release layer and the immediate release layer further comprises a water dissolvable polymer.

14. The device of claim 13 wherein the water dissolvable polymer comprises polyethylene glycol.

15. The device of claim 12 wherein the device comprises the immediate release layer and further comprises a scaffold layer, the scaffold layer associated with said immediate release layer opposite said time release active agent delivery layer.

16. The device of claim 15 wherein said scaffold layer comprises collagen.

17. The device of claim 15 wherein said scaffold layer comprises one or more active agents.

18. The device of claim 17 wherein said one or more active agents of said scaffold layer are vitrified into said scaffold layer.

19. The device of claim 15 wherein said scaffold layer is releasable from said immediate release layer upon the immediate release layer contacting a body fluid or water.

20. The device of claim 15 wherein said scaffold layer has a porosity sufficient to allow migration of one or more endothelial cells within the scaffold layer.

21. The device of claim 15 wherein the scaffold layer is acellular collagen from a fish.

22. The device of claim 1 wherein said time release active agent delivery layer and a scaffold layer both comprise a growth factor, said growth factor not covalently bound to said time release active agent delivery layer or said scaffold layer.

23. The device of claim 22 wherein said time release active agent delivery layer further comprises an antibody, insulin or both.

24. The device of claim 22 wherein said scaffold layer comprises an antibody, insulin, or both.

25. A process of promoting healing of a wound in a subject comprising:
applying a first wound dressing of claim 1 to a wound in a subject for a first treatment time.

26. The process of claim 25 further comprising, removing said first wound dressing, and
applying a second wound dressing of claim 1 to the wound for a second treatment time.

27. The process of claim 26, wherein the second wound dressing excludes a scaffold layer.

* * * * *